US009867496B2

(12) United States Patent
Heuchling

(10) Patent No.: US 9,867,496 B2
(45) Date of Patent: Jan. 16, 2018

(54) COLLAPSIBLE SECONDARY-BURN BIOMASS STOVE AND ASSOCIATED EMBODIMENTS

(71) Applicant: Frederick Douglas Heuchling, Green Bay, WI (US)

(72) Inventor: Frederick Douglas Heuchling, Green Bay, WI (US)

( * ) Notice: Subject to any disclaimer, the term of this patent is extended or adjusted under 35 U.S.C. 154(b) by 261 days.

(21) Appl. No.: 14/833,104

(22) Filed: Aug. 23, 2015

(65) Prior Publication Data

US 2017/0049265 A1 Feb. 23, 2017

(51) Int. Cl.
*A47J 33/00* (2006.01)
*A47J 37/07* (2006.01)

(52) U.S. Cl.
CPC ........... *A47J 33/00* (2013.01); *A47J 37/0763* (2013.01); *A47J 2037/0777* (2013.01); *A47J 2201/00* (2013.01)

(58) Field of Classification Search
CPC .................................................. A47J 37/0763
USPC .................................... 126/9 R, 391.1, 25 R
See application file for complete search history.

(56) References Cited

U.S. PATENT DOCUMENTS

| | | | |
|---|---|---|---|
| 1,569,401 A | 1/1926 | Sims | |
| 1,639,642 A * | 8/1927 | Law | F23L 9/00 110/302 |
| 2,026,387 A | 12/1935 | Jackes et al. | |
| 3,308,807 A | 3/1967 | Little et al. | |
| 4,069,806 A | 1/1978 | Landry | |
| 4,915,091 A * | 4/1990 | Varney | F24B 1/202 126/29 |
| 4,971,027 A * | 11/1990 | Krieger | F24C 1/16 126/390.1 |
| 4,971,045 A | 11/1990 | Probst | |
| 5,119,799 A | 6/1992 | Cowan | |
| 5,303,691 A * | 4/1994 | Armistead | F24C 1/16 126/25 A |
| 5,842,463 A | 12/1998 | Hall | |
| 5,915,371 A | 6/1999 | Hering | |
| 6,851,419 B2 | 2/2005 | Reiner | |
| 6,883,512 B2 | 4/2005 | Esposito | |
| 8,261,731 B2 | 9/2012 | Marsh | |
| 2005/0217657 A1 | 10/2005 | Anue | |
| 2007/0006863 A1 | 1/2007 | Barbarich | |
| 2008/0168978 A1 | 7/2008 | Crimmins | |
| 2009/0165769 A1 | 7/2009 | Van Der Sluis | |
| 2010/0083946 A1 | 4/2010 | Cedar et al. | |
| 2010/0258104 A1 | 10/2010 | DeFoort et al. | |
| 2011/0168168 A1 | 7/2011 | Schneider | |

(Continued)

*Primary Examiner* — Avinash Savani

(57) ABSTRACT

A portable, collapsible, secondary combustion biomass stove which maintains the environmental and efficiency benefits of a secondary-burn biomass stove while removing the need for the weight and volume of permanent insulation. The stove can be quickly and easily assembled or disassembled without the use of tools for storage and transport. The outer housing of the stove provides stability while shielding the user from the high temperatures of secondary combustion within the chimney and combustion chamber, and collapses for stove transport, insulation may be added to the stove using material indigenous to most campsites, whereby stove operating temperature and efficiency increases while toxic gas release and fuel consumption decrease.

18 Claims, 51 Drawing Sheets

(56) References Cited

U.S. PATENT DOCUMENTS

2011/0284047 A1 11/2011 Johnson et al.
2012/0204852 A1 8/2012 Boucher

* cited by examiner

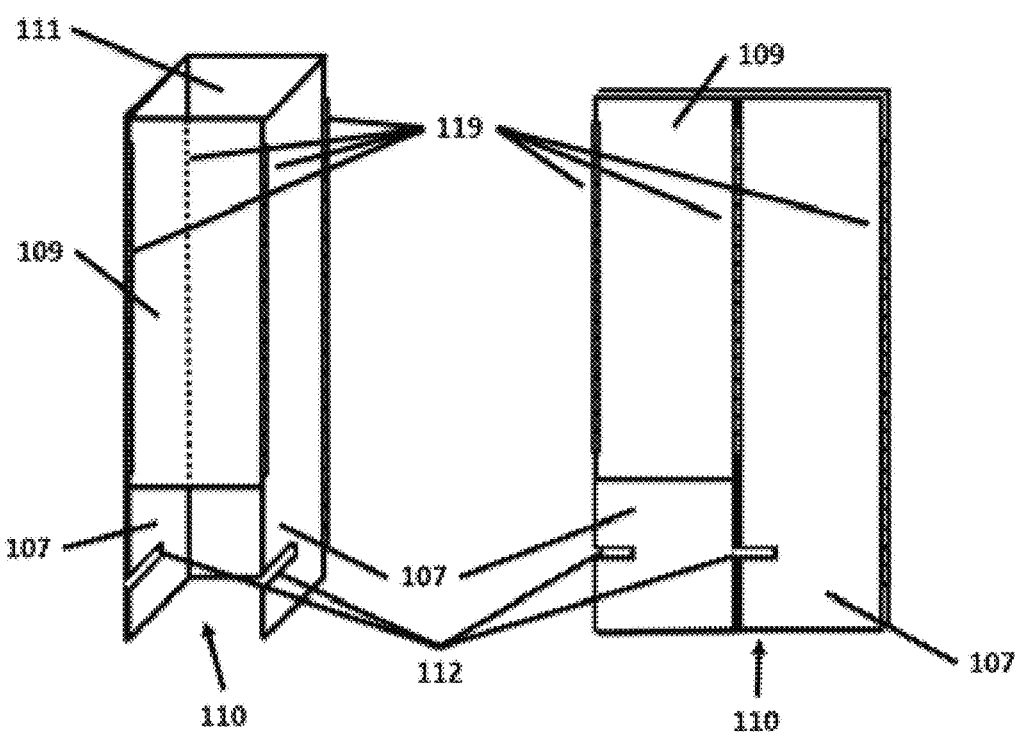

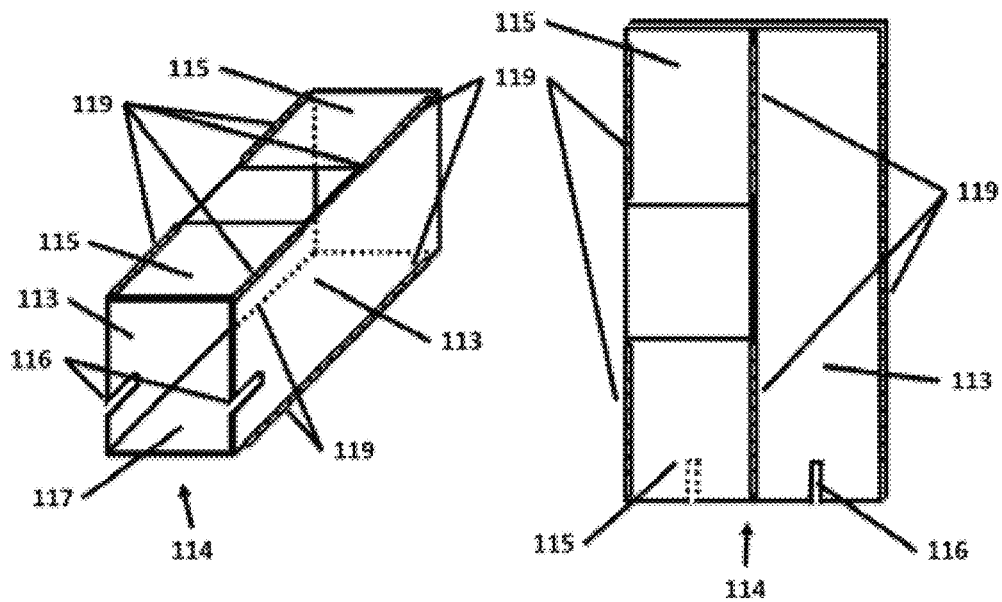

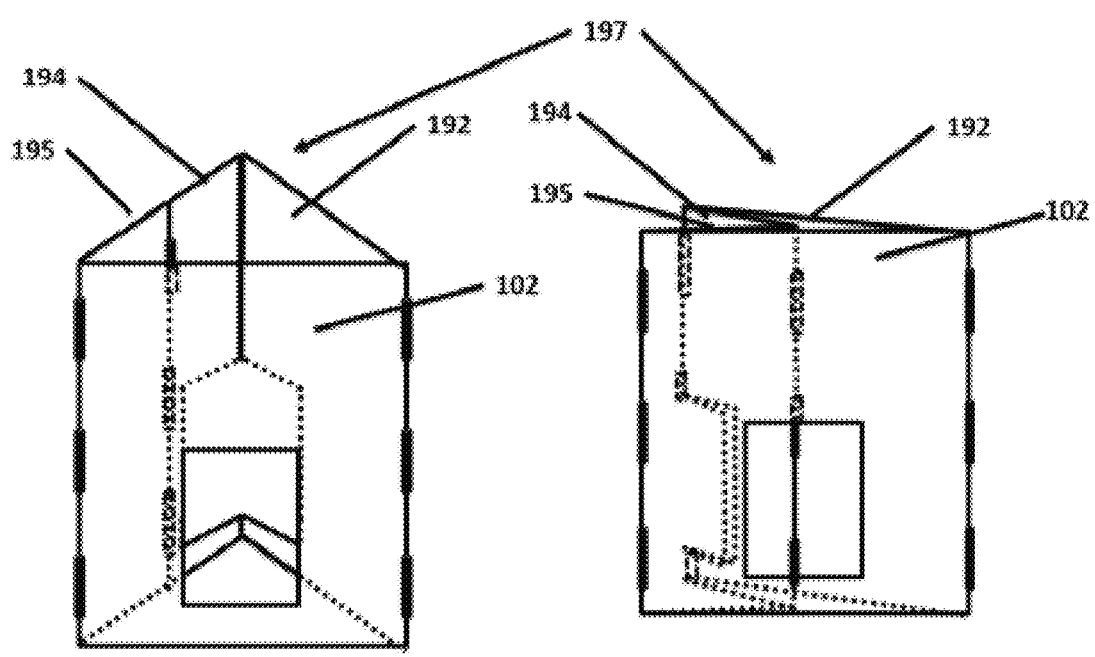

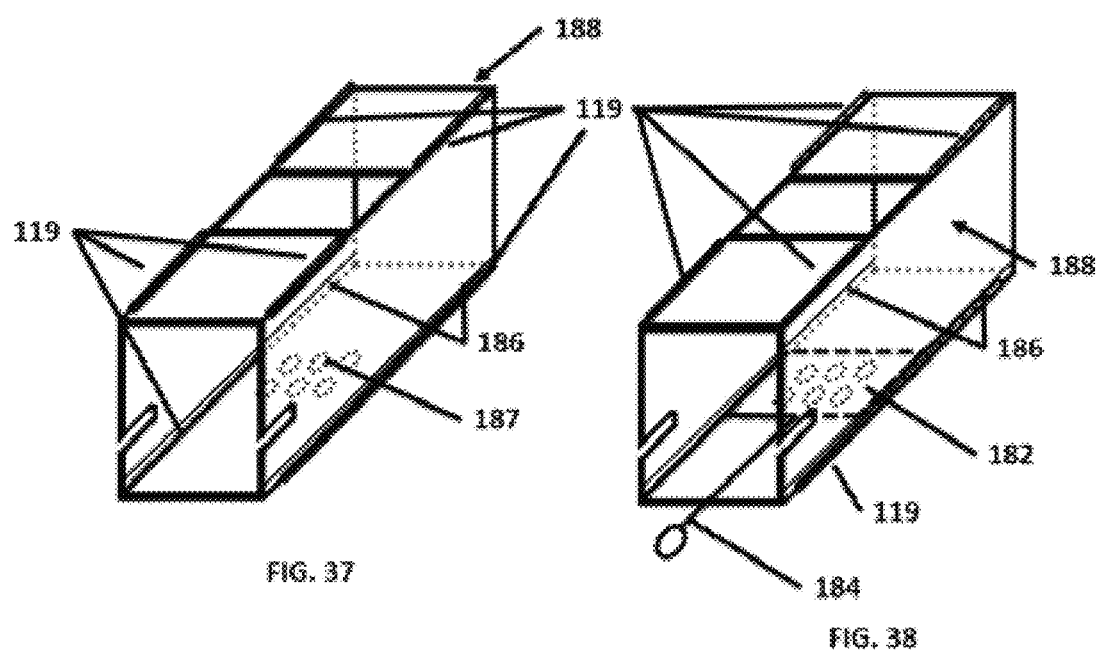

COLLAPSIBLE SECONDARY-BURN BIOMASS STOVE AND ASSOCIATED EMBODIMENTS

CROSS-REFERENCE TO RELATED APPLICATIONS

This application claims the benefit of U.S. Provisional Patent Application Ser. No. 62/041,646 titled Collapsible Rocket Stove And Associated Embodiments filed on Aug. 25, 2014, the entire contents of which are incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Portable camp stoves are a staple item for most backpackers, campers, hikers and survivalists. The most popular current models are propane, butane, or alcohol-fueled stoves. Some of these stoves are compact and lightweight, but each of these invariably requires the transport of fuel to the cooking location. These fuel containers can be bulky and awkward for hiking, camping, and survival applications, for which weight and volume are of considerable importance. These canisters encumber the user and occupy his or her time, since each must be recycled, refilled, or discarded after use.

Campfires remove the need for canisters since they are fueled by sticks, logs, or assorted biomass available on the trail, though campfires are not permitted in many campgrounds. Furthermore, like biomass stoves, campfires offer the environmental advantage of being carbon-neutral, since the carbon dioxide released via natural decomposition of the biomass is instead produced by burning the biomass as fuel. However, burning fuel in a campfire or open flame produces toxic byproducts and hydrocarbons due to inefficient fuel consumption.

As wood burns in a campfire, flammable wood gas is released in the form of volatile organic compounds. These wood gases usually comprise at least 50% of the potential chemical energy available from the wood fuel. Exothermic reactions (wood burning) begin at approximately 250° C., and wood gases do not ignite until approximately 600° C. The combustion configurations of a fireplace or campfire fail to ignite most of these gases since they do not usually reach sufficient temperatures for wood gas combustion. This unburned fuel cools and condenses when dispersed and forms particulates in the form of smoke. Smoke is wasted fuel.

Wood stoves improve on an open fire in that each contains a combustion chamber. In a wood stove the containment of the wood gas within the combustion chamber and chimney apparatus (if one exists) serves to superheat the gas and ignite a "second burn." This second burn allows a wood stove to produce more heat per unit mass of fuel than a fireplace or campfire. The hotter and longer the burn, the more efficient the wood stove. However, most portable wood stove models currently available often do not reach either sufficient temperature or sufficient burn duration to consume most volatile organic compounds, although these are more energy efficient than an open fire.

The "rocket stove," so named for the "rocket" sound the user hears when the stove produces a muffled roar at its high operating temperature, has been a popular biomass stove with wood stove enthusiasts and survivalists in recent decades. The rocket sieve design offers a more efficient use of biomass consumption than many other wood stoves. The rocket stove concept involves a flow of air drawn towards the combustion chamber (a draw) by the partial vacuum created by the high temperatures therein (This relationship is often described quantitatively by either a combination of Charles' Law and Boyle's Law or the Ideal Gas Law, according to preference).

Rocket stoves traditionally utilize an "L-shape" design in order to direct fuel and air into a combustion chamber. Air is channeled horizontally towards the "corner" of the "L-shape" via a fuel and air intake apparatus (the feel and air intake apparatus is often referred to as a wood box or fire box). The channelization of air within the fuel and air intake apparatus prior to combustion preheats the air as it nears the combustion chamber beneath and around the fuel, serving to reduce the convective cooling of the combustion chamber that usually occurs via an uncontrolled interaction of ambient air with the combustion chamber. Rocket stove designs often feature insulation of the combustion chamber and (more often) the chimney apparatus in order to prevent air-cooling of stove surfaces which contain combustion.

The channelization of air also serves to pre-heat the wood prior to combustion, allowing the induced draft within the fuel and air intake apparatus to function as an evaporator. This pre-heating of the wood evaporates water from the fuel, drying the wood and preventing much of the energy loss in the combustion chamber normally expended to evaporate water. Live or "green" wood is comprised of approximately 50% of water by weight, while wood properly stored and left to dry is comprised of approximately 20% of water by weight, depending on environmental factors. The teaching contained herein allows a portable means of pre-heating "greener" or more recently felled biomass prior to combustion, evaporating water from the wood as it nears combustion and expanding potential fuel sources.

The rocket stove's numerous advantages are likely responsible for its popularity among wood stove enthusiasts. These advantages include improvements over current biomass camping stoves, campfires, and gas camping stoves in efficiency, safety, and environmental impact. Since the majority of Chinese, Indian, and African households depend on solid fuel consumption for domestic energy production (often in enclosed of poorly ventilated spaces), environmental and safety problems associated with biomass consumption represent a long-felt but unmet need for amelioration.

The reduction in both ash and smoke production resulting from a rocket stove burn (upon reaching optimal operating temperatures) both testify to its efficiency. One 2007 study documenting the replacement of traditional wood stoves with rocket stoves in sub-Saharan Africa reflects this efficiency. These stoves were non-collapsible, insulated stoves that were used to produce hundreds of thousands of meals over a period of months or years. The four institutions involved in the field test reported a 57-71% reduction in wood fuel purchases upon the introduction of the stoves (*ProBEC Study on the Impact of the Institutional Rocket Stoves in School Kitchens*, August 2007).

Numerous types of woodstoves, camping stoves, and survival stoves have been proposed and patented, however none of these combine the efficiency, collapsibility, convenience, and simplicity of the embodied teachings. Numerous collapsible woodstoves have been patented which are bulky when collapsed and do not offer the potential use of indigenous insulation, for example U.S. Pat. No. 4,069,806 to Landry (1978) and U.S. Pat. No. 5,159,799 to Cowen (1992). Furthermore, numerous woodstoves either do not utilize the rocket stove design advantage of the continuous addition of fuel without removal of the pot, or limit added fuel to very small twigs and sticks which will be quickly consumed without removal of the pot, for example U.S. Pat. No. 0,284,047 A1 to Johnson et al. (2011), U.S. Pat. No. 0,083,946 A1 to Cedar et al. (2010), or U.S. Pat. No. 5,842,463 to Hall (1998).

Other woodstove or camp stove designs do not use insulation of any kind, do not provide for the potential use of insulation indigenous to the site of use as found in the teachings herein, or by virtue of design make the achievement of sustained temperatures necessary for ignition of most secondary wood gases difficult or impossible, furthermore, these stoves fail to provide the safety benefits of an insulated barrier between combustion surfaces and the user. For example U.S. Pat. No. 8,261,731 B2 to Marsh (2012), U.S. Pat. No. 4,971,045 to Probst (1990), or U.S. Pat. No. 0,204,852 to Boucher (2012). Some woodstoves do utilize the design advantages of the rocket stove concept but do not collapse, for example U.S. Pat. No. 0,258,104, A1 to DeFoort et al. (2010). Many other woodstoves require consumable elements for their operation, with their inherent drawbacks of dependency on electrical sources or store-bought fuel. For example U.S. Pat. No. 0,165,769 A1 utilizes a blower to improve efficiency and fuel consumption, but has the drawback of requiring a power source. Other stoves are very light, portable, or collapsible, but require fuel tablets for operation. U.S. Pat. No. 0,217,657 A1 to Anue (2005) and U.S. Pat. No. 6,851,419 B2 to Reiner (2005) fall into this category. Bach of these stoves has its advantages, but nevertheless none of the stoves heretofore known offer the advantages of the collapsible rocket stove design of the teachings herein.

BRIEF SUMMARY OF THE INVENTION

Be it known that Frederick Douglas Heuchling, a Citizen of the United States, residing at Green Bay, in the County of Brown and in the State of Wisconsin, have invented a collapsible secondary-burn biomass stove. The invention provides a housing into which stove components are inserted and assembled. The invention separates the operator from immediate contact with the combustion chamber by allowing the operator to construct the combustion chamber via the assembly of the fuel and air intake apparatus and the chimney apparatus within the housing. The invention provides the user a means of insulating the chimney apparatus and fuel and air intake apparatus using materials indigenous to the cook site (such as dirt, rocks, etc.), removing the need for the transport of high-volume or high-weight insulating material. The invention allows a portable means of preheating biomass prior to combustion, evaporating water from the wood as it nears combustion, increasing efficiency through higher operating temperature, and expanding potential fuel sources to wetter, "greener" wood. The invention provides a lightweight and high-efficiency biomass stove that preserves the rocket stove concept in a portable, collapsible configuration.

One embodiment described herein has achieved temperatures in excess of 1700° Fahrenheit using scrap wood, a temperature well in excess of that necessary to achieve secondary combustion and the ignition of wood gases. Furthermore, the embodiment described herein collapses roughly to the dimensions of a large-screen laptop computer, a storage savings of over 90% of the expanded version. The embodiments herein described also offer advantages in stability over many commercially available rocket stoves, which are often supported by welded legs or a tripod. In addition, the wide, square base of most of the embodiments taught herein is less likely to tip over and dump embers on an unintended area.

The improvement in efficiency is a direct consequence of improved combustion, which translates to decreased production of the products of incomplete combustion. These detrimental products include the production of hydrocarbons and carbon monoxide, both of which carry negative health costs upon inhalation. The World Health Organization estimates that 2.7 to 3 million people die each year as a consequence of pollution from solid fuel use. Any decrease in the production of these pollutants will carry positive health implications for the users.

The stoves in the African study referred to above, however, like the rocket stoves currently available on the market, are either too heavy or too bulky to serve as an ideal camping, hiking, or survival solution. The smaller of these stoves often weigh at least 15 lbs, and require several square feet of packing space. Furthermore, most rocket stoves currently available and advertised as portable do not allow for insulation of the chimney apparatus and fuel and air intake apparatus, in contrast to embodiments here presented. In contrast to currently available rocket stoves, the embodiments taught herein offer a lighter, more compact solution over currently available rocket stove designs that preserves the rocket stove concept.

The enclosed teaching also addresses a long-felt, unmet need in the field of survival applications. In the event of a massive power outage or burst water lines, a sanitary source of water for cooking and hygiene may not be available. In the wake of hurricanes Katrina and Sandy, for example, millions of Americans found themselves without a source of clean water, sometimes for days. Often, there was no shortage of fresh water from local sources, but there was no ready means of sanitizing what water was available, especially in an urban environment where campfires are less practicable. A lightweight, efficient means of burning scrap wood made possible by the embodiments presented herein allow the sanitation of water or cooking of meals without recourse to power or gas. Furthermore, the enclosed combustion chamber of the design herein described would mitigate concerns of accidental secondary fires due to external combustion in an urban environment.

The use of a main housing to separate the user from the combustion chamber is an additional safety feature not found in most commercially available, portable rocket stoves. This feature decreases the likelihood of accidental burns during employment of the stove. Furthermore, the embodiments described herein allow for the potential use of insulation indigenous to the campsite, for example and without limitation dirt, rocks, or sand. This insulating material is added inside the main housing around the combustion chamber, fuel and air intake apparatus, and chimney apparatus to achieve higher operating temperatures and efficiency. This allows for the transport weight of the collapsible rocket stove described herein to be considerably less than that of an expanded and insulated rocket stove in the tested versions. This fraction varies depending on the insulating material and the particular dimensions of the rocket stove employed.

BRIEF DESCRIPTION OF THE SEVERAL VIEWS OF THE DRAWING

FIG. 5 is a perspective view of a rectangular chimney apparatus in expanded configuration.

FIG. 6 is a perspective view of a rectangular chimney apparatus in collapsed configuration.

FIG. 7 is a perspective view of a rectangular fuel and air intake apparatus in expanded configuration.

FIG. 8 is a perspective view of a rectangular fuel and air intake apparatus in collapsed configuration.

FIG. 28 is a perspective view of a triangular main housing with a folding side panel and a single rear fuel and air intake apparatus window in expanded configuration.

FIG. 29 is a perspective view of a triangular main housing with a folding side panel and a single rear fuel and air intake apparatus window in a partially collapsed configuration.

FIG. 37 is a perspective view of one embodiment of a fuel and air intake apparatus with a perforated grate section.

FIG. 38 is a perspective view of one embodiment of a fuel and air intake apparatus with a perforated grate section with one embodiment of a sliding grate with lever and catch rods for the sliding grate.

DRAWINGS—REFERENCE NUMERALS

Figure 1:
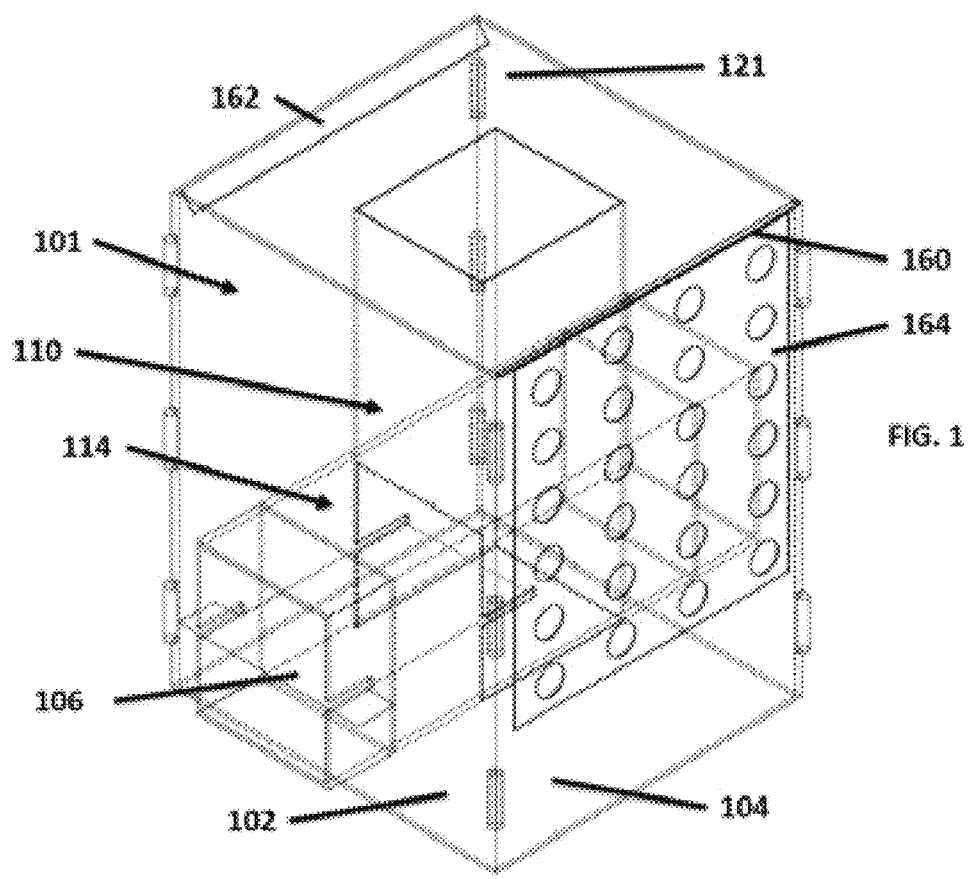
FIG. 1 is a perspective view of a first embodiment in assembled configuration.

101 main housing
102 front main housing panel
103 left main housing panel
104 right main housing panel
105 fuel and air intake apparatus window (rectangular)
106 separator
107 chimney apparatus side panel
108 hinge
109 chimney apparatus front panel
110 chimney apparatus (rectangular)
111 chimney apparatus rear panel
112 chimney apparatus separator slot
113 fuel and air intake apparatus side panel
114 fuel and air intake apparatus (rectangular)
115 fuel and air intake apparatus top panel
116 fuel and air intake apparatus separator slot
117 fuel and air intake apparatus bottom panel
118 rectangular main housing with cylinder fuel and air intake apparatus openings
119 hinge for chimney apparatus and fuel and air intake apparatus
120 cylinder fuel and air intake apparatus opening (rectangular)
121 rear main housing panel
124 cylindrical main housing with cylindrical fuel and air intake apparatus openings
125 curl-hook fastener
126 front cylinder fuel and air intake apparatus opening
128 rear cylinder fuel and air intake apparatus opening
130 peg fastener
132 hole for peg fastener
134 cylindrical main housing with rectangular fuel and air intake apparatus openings
136 front rectangular fuel and air intake apparatus opening
138 rear rectangular fuel and air intake apparatus opening
140 cylindrical chimney apparatus
142 cylindrical chimney apparatus separator slot
144 cylindrical chimney apparatus fuel and air intake apparatus opening
146 cylindrical fuel and air intake apparatus
148 cylindrical fuel and air intake apparatus separator slot
150 cylindrical fuel and air intake apparatus chimney apparatus opening
152 fuel and air intake apparatus separator catch bar
154 housing hinge for housing base plate
156 housing base plate
157 housing base plate hinge
158 catch bar for housing base plate
160 hinge for cook surface plate
162 catch bar for housing cook surface plate
164 hinged cook surface plate
166 stability rod
168 holes for stability rod
170 guide rails for chimney apparatus
171 groove for non-hinged front/rear panel
172 non-hinged front/rear main housing panel
173 tongue for non-hinged side panel
174 non-hinged side main housing panel
176 chimney apparatus with front and rear fuel and air intake apparatus openings
178 fuel and air intake apparatus separator hinge
179 fuel and air intake apparatus with hinged separator plate
180 fuel and air intake apparatus hinged separator plate
182 sliding grate for fuel and air intake apparatus
184 sliding grate lever for fuel and air intake apparatus
186 catch rod for sliding grate
187 perforated grate section
188 fuel and air intake apparatus with perforated grate section
189 dual separator fuel and air intake apparatus
190 triangular main housing with dual fuel and air intake apparatus windows
191 triangular main housing with single fuel and air intake apparatus window
192 triangular main housing right rear panel with single fuel and air intake apparatus window
193 triangular main housing left rear panel with single fuel and air intake apparatus window
194 triangular main housing left rear hall-panel
195 triangular main housing left front half-panel
196 triangular main housing right rear panel with dual fuel and air intake apparatus windows
197 triangular main housing with folding half-panels
198 triangular main housing left rear panel with dual fuel and air intake apparatus windows
200 cylindrical main housing with curl-hook fasteners
213 rectangular main housing with hinged side half-panels
214 main housing hinged half-panel
216 auxiliary cylindrical gravity-fed fuel and air intake apparatus
217 auxiliary rectangular gravity-fed fuel and air intake apparatus
218 main housing panel opening for auxiliary gravity-fed fuel and air intake apparatus 220 chimney apparatus opening for auxiliary gravity-fed fuel and air intake apparatus
222 fuel and air intake apparatus opening for auxiliary gravity-fed fuel and air intake apparatus
    224 removable pin in partial curl hinge system
    226 interlocking partial curl
    228 gravity-fed fuel and air intake apparatus catch
    234 separator with parabolic edge
    235 fuel and air intake apparatus with adjustable air vent
    236 separator with air vent adjustment rod
    238 air vent adjustment rod
    240 slide tube for air vent adjustment rod
    242 air vent adjustment plate
    244 hinge for air vent adjustment plate
    246 hole catch for air vent adjustment rod
    248 hinged cook surface grate
    250 holes for hinged cook surface grate tabs
    252 hinged cook surface tabs
    254 grill support rods
    256 tab for tab/slot assembly
    258 slot for tab/slot assembly
    260 folding panel main housing with tab/slot assembly system
    262 re-drafter box with cook plate attachment
    264 re-drafter vent hole
    266 re-drafter wire harness
    268 wire harness catch tab
    270 hinged re-drafter panel
    272 re-drafter wire harness hinge
    274 gravity-fed fuel and air intake apparatus
    276 gravity-fed cylindrical chimney apparatus
    278 gravity-fed main housing
    280 separator plate with legs
    282 hole for chimney apparatus stability leg
    284 chimney apparatus stability leg
    286 separator plate supports
    288 chimney apparatus with stability legs
    291 fuel and air intake apparatus with holes for chimney apparatus stability legs

DETAILED DESCRIPTION OF THE INVENTION

Description 1st Embodiment (FIGS. 1-12)

The following detailed description comprises several contemplated modes of carrying out the numerous exemplary embodiments of the invention. The description that follows is not to be taken in a limiting sense, but rather is offered for the purpose of illustrating the general principles of the invention. Generally speaking, the collapsible rocket stove embodiments taught herein provide a simple, portable, high-efficiency cooking solution across camping, hiking, and survival applications.

In reference to FIGS. 1 through 10, a collapsible rocket stove according to one present embodiment is described in detail. The expanded and completed structure of this embodiment is seen in FIG. 1. The interior of this embodiment contains a chimney apparatus 110 and a fuel and air intake apparatus 114 inserted into a main housing 103. A separator 106 is inserted into the fuel and air intake apparatus 114 and chimney apparatus 110. A hinged cook surface plate 164 is seen in an open configuration. The hinged cook surface plate 164 is hingedly attached to the right main housing panel 104 and is advantageously movable between a closed and open position.

I presently contemplate that the chimney apparatus 110, fuel and air intake apparatus 114, and hinged cook surface plate 164 components of this embodiment are composed of type 304 stainless steel, while the main housing is composed of aluminum. Each component, however, may be comprised of a variety of materials suitable for the purpose, such as high-carbon steel, titanium, polycarbonate, ceramic, brick or any combination of materials resistant to high temperature.

Figure 2:
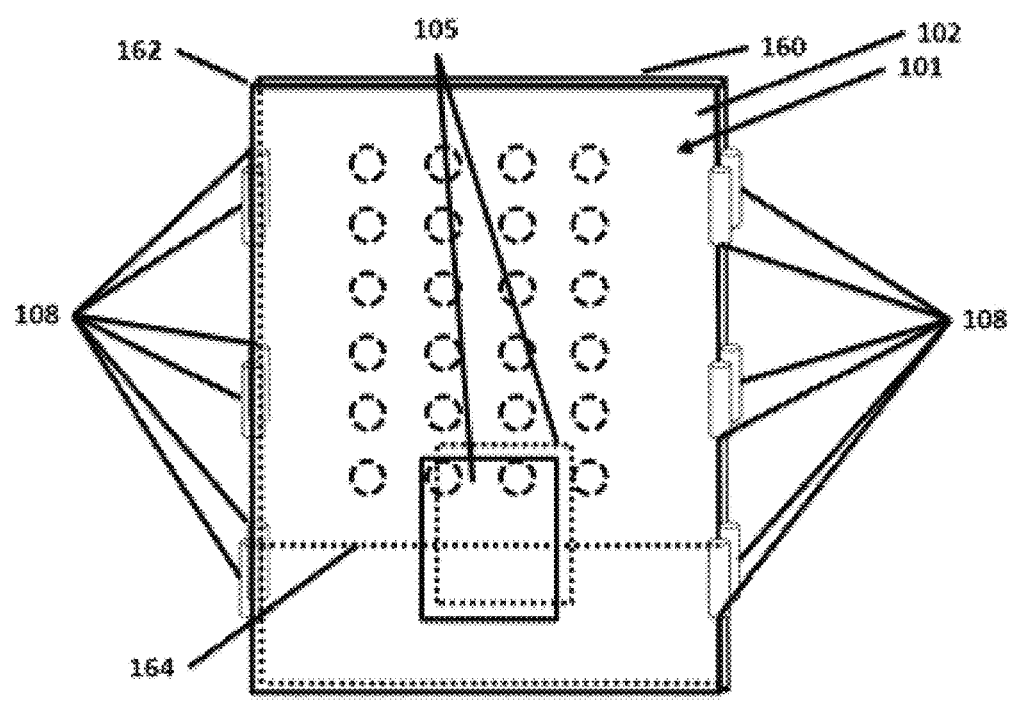
FIG. 2 is a perspective view of a main housing laid flat and folded twice.
Figure 3:
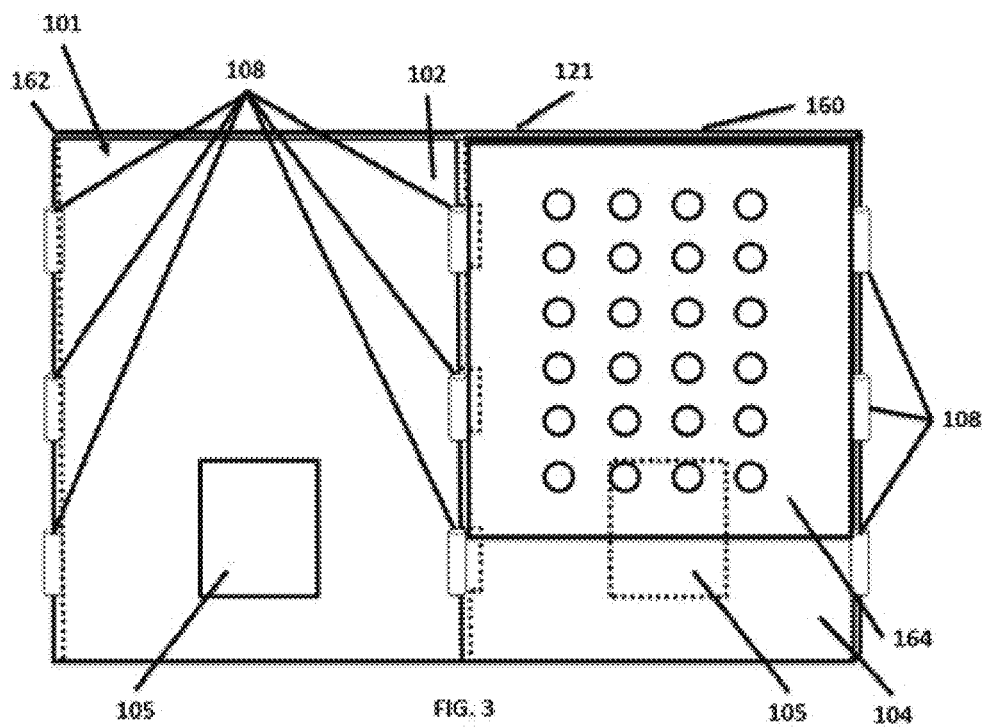
FIG. 3 is a perspective view of a main housing laid flat and unfolded once.

FIG. 2 details a present embodiment of a main housing 101 in a collapsed and folded configuration. Main housing 101 is preferably but not necessarily comprised of four walls, and preferably but not necessarily of a planar geometry. FIG. 3 details the main housing 101 in a collapsed configuration and unfolded once. A side main housing panel 104 hingedly attaches to a front main housing panel 102 via three hinges 108 in this embodiment. Another side main housing panel 103 hingedly attaches to the other side of the front main housing panel 102 via three hinges 108. Likewise a rear main housing panel 121 hingedly attaches to the left main housing panel 103 and right main housing panel 104 via three hinges 108 on each opposing side. The front main housing panel 102 and rear main housing panel 121 each have a fuel and air intake apparatus window 105. To enable folding of the main housing panels, either the side main housing panel 104 or side main housing panel 103 may be slightly wider than the other to accommodate the thickness of the hinge and width of the panels. Likewise, either the front main housing panel 102 or rear main housing panel 121 may be slightly wider than the other to accommodate the thickness of the hinge and width of the panels when folding. The degree of difference in the width of these panels is determined by the type of hinge employed and thickness of the main housing panels.

Figure 4:
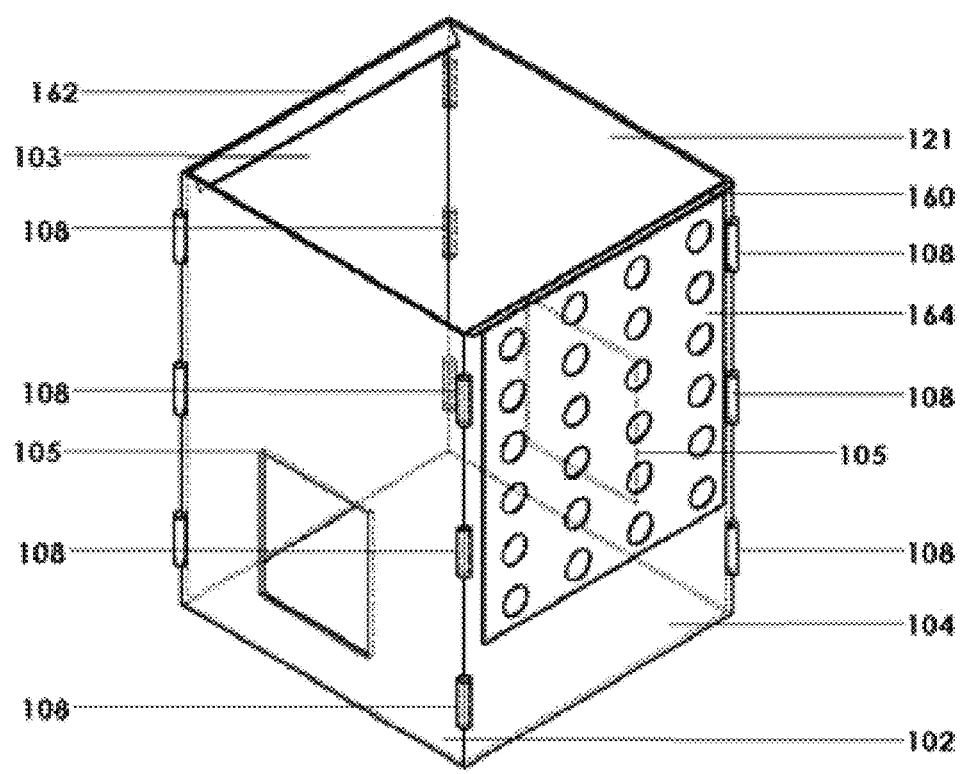
FIG. 4 is a perspective view of a main housing in expanded configuration.

FIG. 4 details the expanded main housing 101. FIG. 5 details one embodiment of the chimney apparatus 110 in which the chimney apparatus 110 is advantageously movable between an expanded configuration and a collapsed configuration, detailed in FIG. 6. A chimney apparatus front panel 109 is hingedly attached to two chimney apparatus side panels 107 by hinges 119. The chimney apparatus side panels 107 in this embodiment are likewise hingedly attached to a chimney apparatus rear panel 111 via hinges 119. Those skilled in the art will note that any number or length of hinges 119 may be used to hingedly connect the chimney apparatus side panels 107 to the chimney apparatus front panel and to the chimney apparatus rear panel 111. The chimney apparatus side panels 107 each feature a chimney apparatus separator slot 112 in this embodiment.

Figure 9:
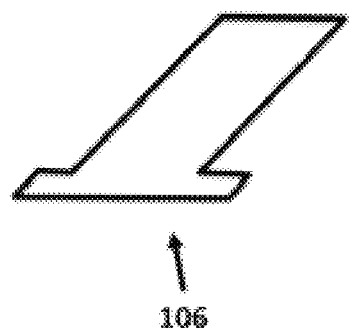
FIG. 9 is a perspective view of a separator.

FIG. 7 details fuel and air intake apparatus 114, in which fuel and air intake apparatus side panels 113 are hingedly attached to fuel and air intake apparatus top panels 115 and a fuel and air intake apparatus-bottom panel 117. The fuel and air intake apparatus 114 is advantageously movable between an expanded configuration in FIG. 7 and a collapsed configuration as in FIG. 8. The fuel and air intake apparatus 114 is configured to accept the insertion of the separator plate 106 into fuel and air intake apparatus separator plate slots 116 within each of the fuel and air intake apparatus side panels 113. The separator plate is seen in FIG. 9.

It will be apparent to those of ordinary skill in the art that the fuel and air intake apparatus 114 need not feature the chimney apparatus opening at the midpoint of the top of the fuel and air intake apparatus, as detailed in FIG. 7 and in most figures to follow. That is, the fuel and air intake apparatus top panels 115 need not be of identical length, and the fuel and air intake apparatus 114 could be configured such that the chimney apparatus inserted either towards or away from the "front" or "fuel-feeding" section of the feel and air intake apparatus 114. An embodiment in which the chimney apparatus was located further away from the "front" of the fuel and air intake apparatus, for example, would permit a longer distance and therefore longer duration of pre-heating the fuel before entry into the combustion chamber.

Figure 10:
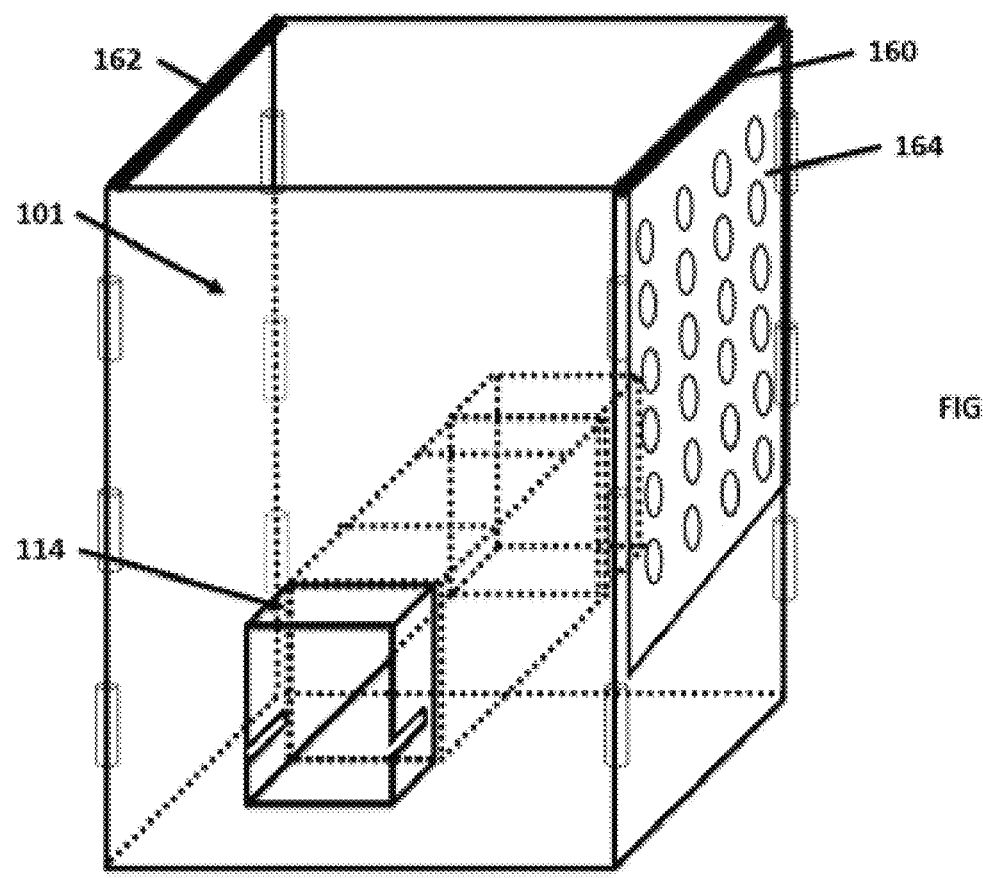
FIG. 10 is a perspective view of a main housing expanded with fuel and air intake apparatus inserted into main housing.
Figure 11:
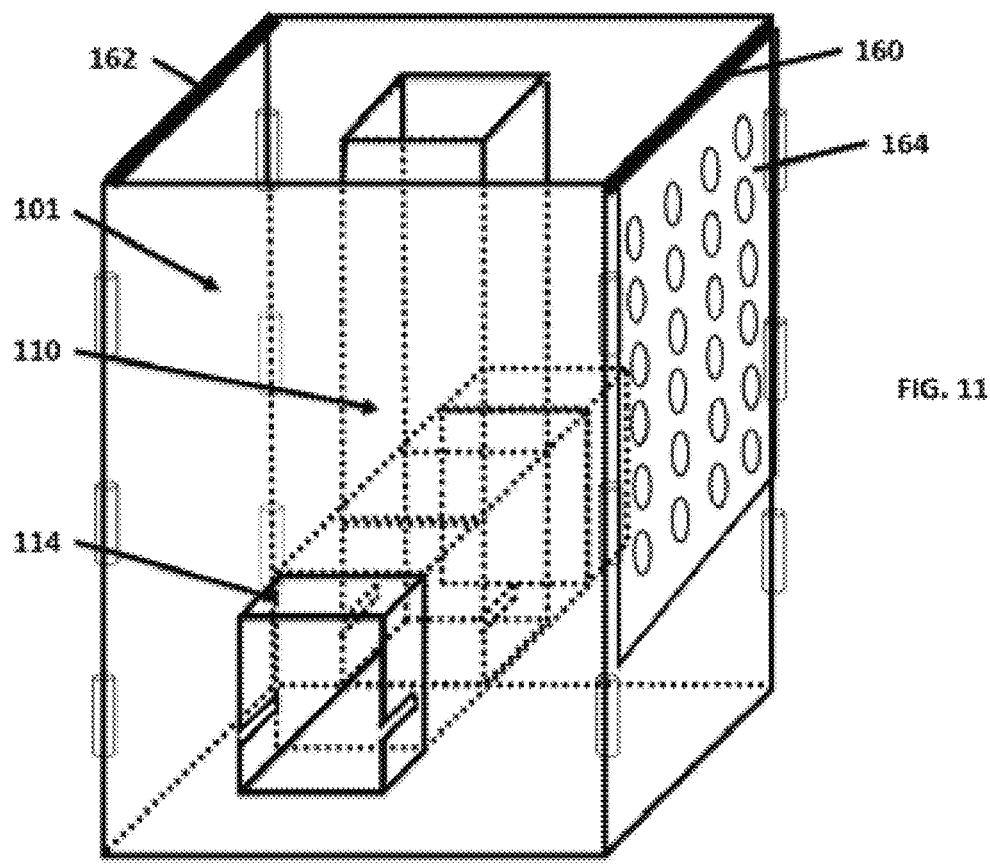
FIG. 11 is a perspective view of a main housing expanded with fuel and air intake apparatus and chimney apparatus inserted into main housing.
Figure 12:
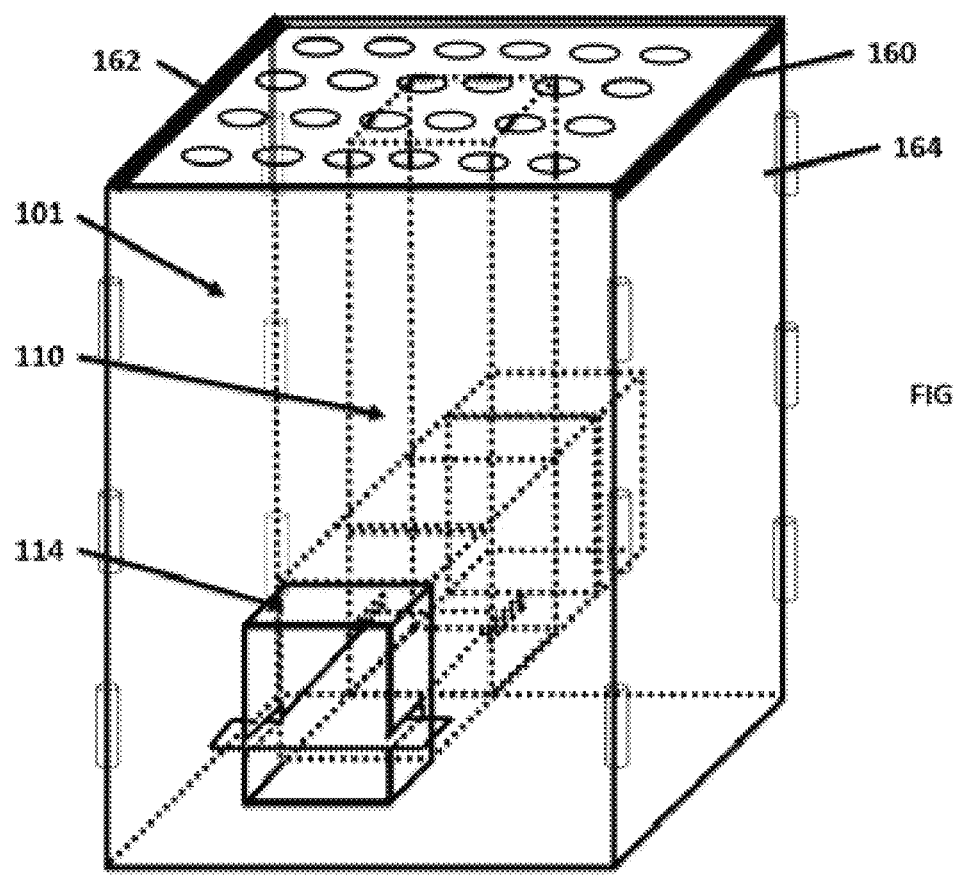
FIG. 12 is a perspective view of a first embodiment in assembled configuration with closed cook plate surface.

FIG. 10 details the fuel and air intake apparatus 114 inserted into a fuel and air intake apparatus window 105 in the front main housing panels 102 and rear main housing panel 121. FIG. 11 details the chimney apparatus 110 inserted into the fuel and air intake apparatus 114. FIG. 12 details the completed folding rocket stove configuration with the hinged cook surface plate 164 in a closed configuration with separator 106 inserted into fuel and air intake apparatus 114 and chimney apparatus 110. In this embodiment, the separator plate fits within the fuel and air intake apparatus separator plate slots 116 and the chimney apparatus separator plate slots 112.

Alternate Component Configurations—1$^{st}$ Embodiment (FIGS. 1 to 12)

Those skilled in the art will note that any number of hinges 108 may be used to connect the side main housing panel 103 and side main housing panel 104 to the front main housing panel 102 and rear main housing panel 121. Likewise those skilled in the art will note that hinge 108 may be replaced by a single continuous hinge 160, a rod and a series of cylinders or approximately cylindrical elements either continuous with or attached to the sides of the component panels. Likewise any number of hinges or hinge substitutes attaching hinged cook surface plate 164 to right main housing side panel 104 may be employed. Those skilled in the art will note that any individual hinge 108 or continuous hinge 160 throughout the collapsible rocket stove may likewise be replaced with any number of hinges, with a continuous hinge, or with another attaching mechanism functioning as a hinge (e.g. a rod and with a threaded end running through a series of cylinders, loops, wires, etc. and attaching to a threaded apparatus or nut at the opposite end). Likewise, coiled wires, rolled steel cylinders, or approximately cylindrical elements may also be substituted for hinges, whereby these elements are permanently affixed to adjacent elements in a manner clear to those skilled in the art. These hinge 108 substitutions or continuous hinge 160 substitutions may be applied to any other hingedly connected elements discussed herein. In addition, three of the four main housing panels may be hinged, while the fourth is attached via tab and slot attachments or another means of attachment achieving the same purpose.

Variously, hinges may be omitted entirely, utilising permanently expanded components for chimney apparatus 110 and fuel and air intake apparatus 114 while retaining the structure of the rocket stove. As with the embodiment discussed with collapsible components, the permanent or non-hinged components are assembled utilizing an outer housing and interior components advantageously inserted into the outer housing for cooking, or disassembled for cleaning, storage, or transport. For example, a main housing 101 may be collapsible in the manner described, while non-hinged/non-collapsible components are inserted and assembled within the housing. Such an embodiment would retain some of the ad vantages of reducing storage and transport volume of a rocket stove constructed out of entirely collapsible components while omitting complications and high construction costs associated with the use of hinges or components functioning as hinges. Such an embodiment would also retain the advantage of potential use of indigenous insulating material, such as dirt, rocks, etc. utilized at the site of use, and discarded without adverse environmental consequence upon disassembly.

Alternatively, an embodiment of the collapsible rocket stove in which one or more components consist entirely or partially of panels inserted into appropriate slots in the main housing is possible. This configuration could omit the use of some or all hinges, saving on cost, weight, and complexity. For example, the fuel and air intake apparatus 114 could be constructed of a bottom plate and hinged side panels, and inserted into the main housing in a "U" configuration. The top plate then consists of a panel overlaid upon the open top of the fuel and air intake apparatus after fuel and air intake apparatus insertion. The side panels may be inserted into slots maintaining the expanded position of the "U" shaped bottom, and side portion of the fuel and air intake apparatus. The top panel may then be overlaid upon the fuel and air intake apparatus (held in place via overhanging bends in the top panel or some alternate means of attachment).

A further alternate embodiment in which any or all component panels are embossed, ribbed, or otherwise altered for rigidity is envisioned. That is, in order to preclude warping and increase component rigidity, a pattern of either a purely functional or decorative nature is pressed, embossed, or otherwise imparted so as to change the section modulus of the component. This change enables the components to better withstand the extreme anisotropic heating and cooling involved in prolonged rocket stove operation without component deformation.

Operation—1$^{st}$ Embodiment (FIGS. 1 to 12)

The operation of the first embodiment detailed in FIGS. 1 to 12 is described below. The main housing 101 in collapsed configuration (FIG. 2) is unfolded as in FIG. 3 and expanded as in FIG. 4. The chimney apparatus 110 in collapsed configuration as in FIG. 6 is expanded as in FIG. 5. The fuel and air intake apparatus 114 in collapsed configuration as in FIG. 8 is expanded as in FIG. 7. The collapsible configuration for the main housing 101, chimney apparatus 110, and fuel and air intake apparatus 114 reduces the volume the user must commit to storage and transport of the rocket stove.

The fuel and air intake apparatus 114 inserts into the main housing window 105 in the front housing panel 102. In this embodiment, the fuel and air intake apparatus rests partially extruding from the front main housing panel 102 and rear main housing panel 121, forming a bridge between the housing panels as seen in FIG. 10. The "bridge" formed by the insertion of the fuel and air intake apparatus into the main housing serves to elevate the combustion chamber from both the ground and the main housing 101. The chimney apparatus 110 is inserted into fuel and air intake apparatus 114 as seen in FIG. 11. The separator plate 106 is inserted into the fuel and air intake apparatus separator plate slots 116 and chimney apparatus separator plate slots 112 as seen in FIG. 12. It will be clear to those skilled in the art that the fuel and air intake apparatus 114 could also rest upon the ground, whereby the fuel and air intake apparatus windows 105 would likewise be continuous or nearly continuous with the bottom edge of the front main housing panel 102 and rear main housing panel 121.

The insertion of the separator plate 106 serves to divide the fuel and air intake apparatus 114 into two sections. The volume within fuel and air intake apparatus 114 above separator plate 106 functions as the solid fuel intake of the rocket stove. The user may insert twigs, sticks, and assorted biomass into this section of the fuel and air intake apparatus 114. The volume within fuel and air intake apparatus 114 beneath the separator plate 106 functions as the air intake for the rocket stove, which will serve to supply oxygen into the combustion chamber. The combustion chamber is substantially located within the volume contained within both the chimney apparatus 110 and the fuel and air intake apparatus 114.

At this point several alternate configurations may be employed in operation of this embodiment of the collapsible rocket stove. Insulation may be added after the rocket stove is expanded and assembled within the main housing 101 around the fuel and air intake apparatus 114 and chimney apparatus 110. This serves to elevate the operating temperature of the stove and reduce connective losses due to ambient air contact with the outer chimney apparatus 110 and fuel and air intake apparatus 114 panel walls. This insulation may be indigenous to a campsite or cook site, for example but not limited to earth, small stones, clay or sand. Alternatively, vermiculite, kitty litter, or any insulating material available may be employed as desired. The added insulation will increase the efficiency of the embodiment by raising the temperature of the fuel and air intake apparatus 114, chimney apparatus 110, and combustion chamber. The higher temperature will allow for a more complete "re-burn" of the hydrocarbons released during the burning of the biomass normally lost as smoke. Likewise, it will be apparent to those of ordinary skill in the art that the chimney apparatus 110 or fuel and air intake apparatus 114 may be insulated from within by an appropriate material inserted into the chimney apparatus 110 or fuel and air intake apparatus 114, either slid into place upon expansion or fixedly attached to any or all of the component panel walls. Such an insulation could be comprised of tile, ceramic, high-temperature ceramic fiber insulating cloth, or any material suitable for the purpose.

Sticks, twigs, or assorted biomass are then inserted into the combustion chamber, along with tinder, kindling, or paper according to preference. The fire is then kindled, and the high temperature of the ignited biomass in the combustion chamber creates a low pressure region. This pressure gradient draws air into the fuel and air intake sections of the fuel and air intake apparatus 114. The confined combustion within the high temperature combustion chamber and chimney apparatus 110 serves to contain and prolong the combustion of fuel, leading to a more complete consumption of available hydrocarbons and highly efficient fuel consumption. This high temperature environment is further assisted by another well-known feature of the rocket stove concept. That is, a pre-heating of the air and fuel due to the confinement of the draft to the fuel and air intake apparatus 114, where the air and fuel are heated along their path to the combustion chamber.

As the draft then continues up the chimney apparatus 110, secondary combustion continues as the heat and combustion products are channeled and expelled towards the cook surface. The hinged cook surface plate 164 is now closed. In this embodiment, the cook surface plate 164 attaches to the right main housing panel 104 via the hinge for cook surface plate 160. The side of the cook surface plate 164 opposite the hinge for cook surface plate 160 rests upon the catch bar for housing cook surface plate 162. Fuel can now be fed into the fuel and air intake apparatus for continuous cooking in any pot, pan, or cooking instrument placed on the hinged cook surface plate 164. Temperature can be partially controlled by limiting the available biomass in the fuel and air intake apparatus 114.

The addition of insulation will also provide a heat source for a greater duration than an air-insulated cook, allowing heat trapped in the insulation to release its energy gradually as the insulating material cools. Either variation will provide a highly efficient portable biomass stove, and the particular choice of insulation, if any, will vary according to preference and available material.

Figure 13:
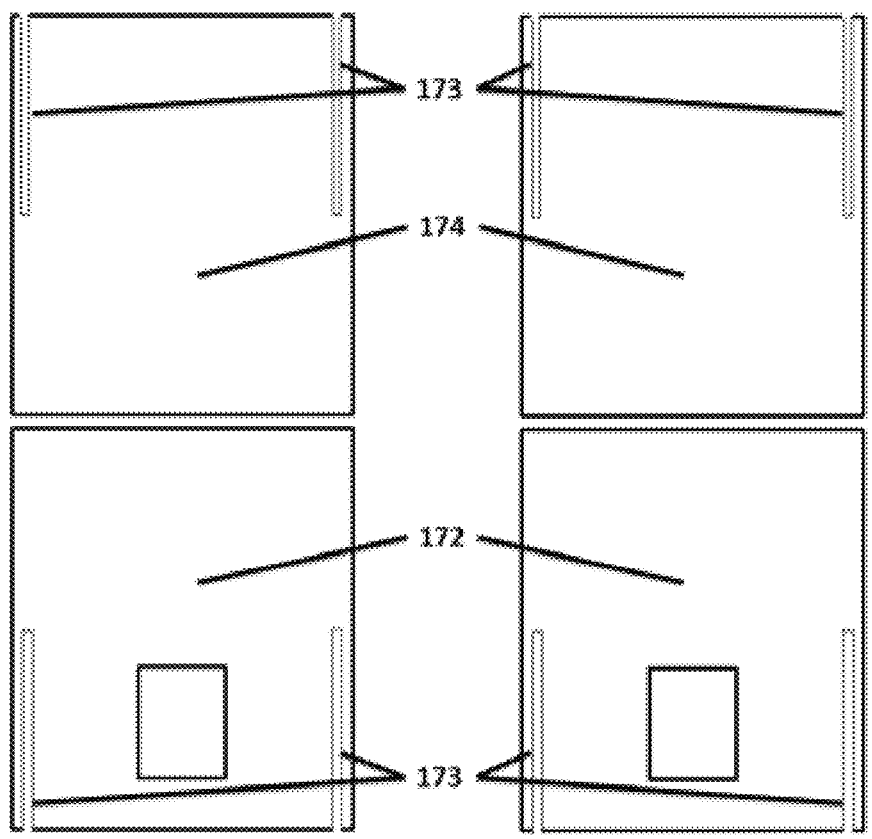
FIG. 13 is a perspective view of one embodiment of a main housing composed of non-hinged panels laid flat.
Figure 14:
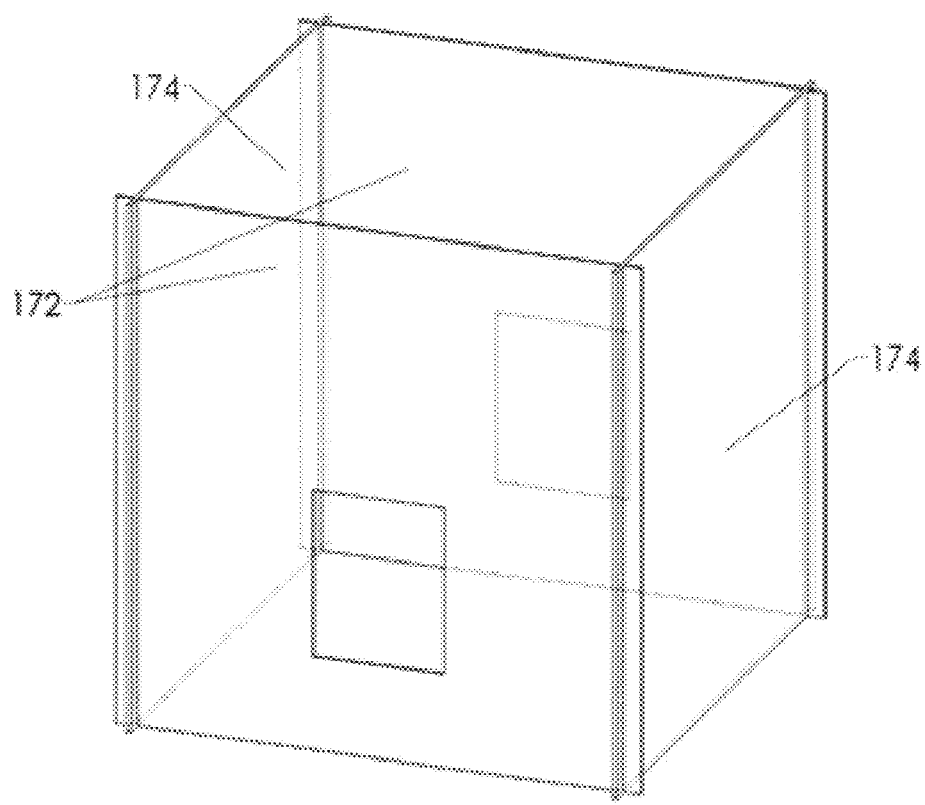
FIG. 14 is a perspective view of one embodiment of a main housing composed of non-hinged panels in an expanded configuration.
Figure 15:
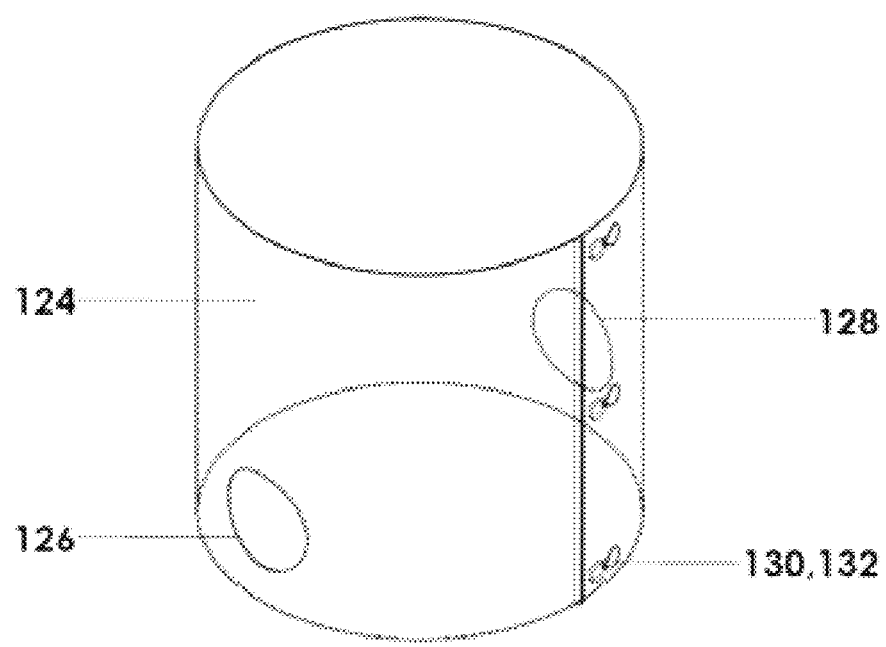
FIG. 15 is a perspective view of a cylindrical main housing with cylindrical fuel and air intake apparatus openings in a rolled configuration.

Description and Operation—$2^{nd}$ Embodiment (FIGS. 13 to 14)

FIG. 13 details an alternate embodiment of the main housing, in which non-hinged panels comprise the main housing and are assembled via a tongue and groove. In this embodiment, a tongue for non-hinged side panel 173 within a non-hinged side main housing panels 174 fits into a groove for non-hinged front/rear main housing panel 171 within non-hinged front/rear main housing panels 172 as seen in FIG. 14. This configuration may be preferable in some instances where cost and weight are of principle concern, as this embodiment omits the need for the cost and weight of main housing hinges. Operation of the $2^{nd}$ Embodiment then proceeds identically to the $1^{st}$ Embodiment.

Description and Operation—Cylindrical Configurations (FIGS. 15 to 27)

Figure 16:
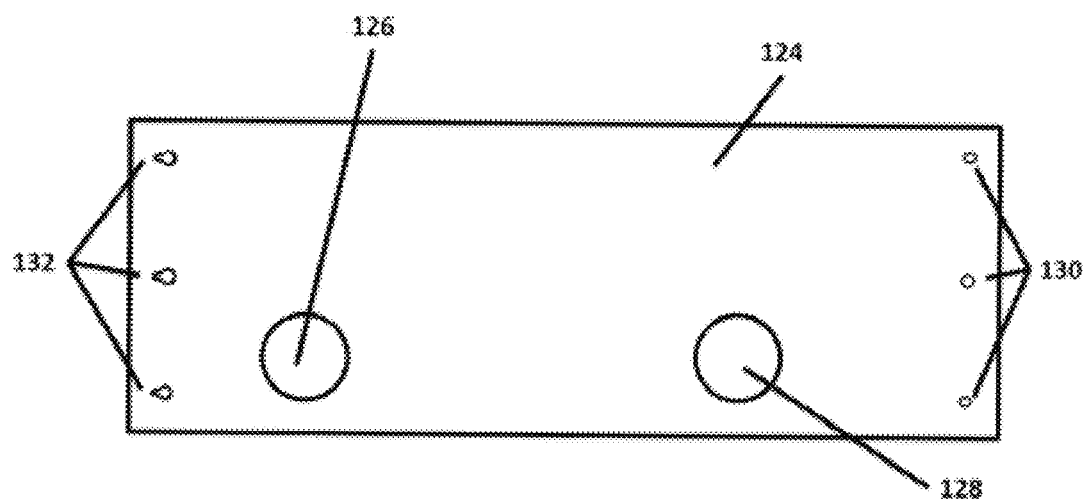
FIG. 16 is a top-down view of a cylindrical main housing with cylindrical fuel and air intake apparatus openings in an unrolled configuration.
Figure 17:
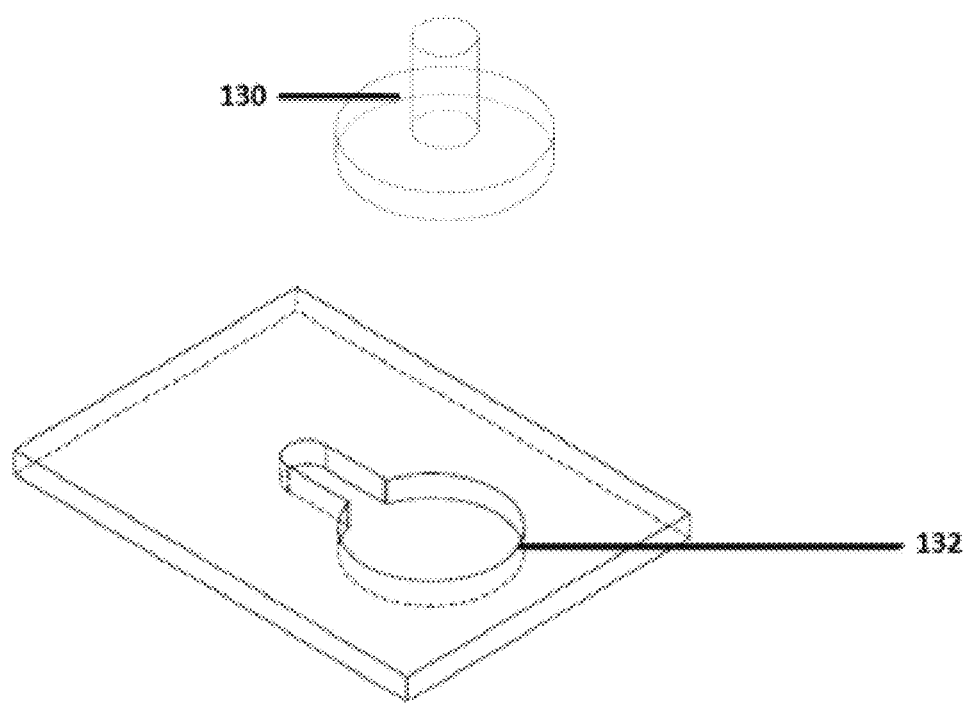
FIG. 17 is a perspective view of a peg and hole fastener system for cylindrical components.

FIG. 13 details an alternate embodiment of the main housing, in which a cylindrical main housing 124 is employed and seen in a rolled or expanded configuration. This embodiment is envisioned to consist of a single sheet with circular fuel and air intake apparatus openings 126 and 128 opposite one another when the sheet is rolled into a cylinder. FIG. 16 details the cylindrical main housing embodiment 124 in an unrolled configuration.

This configuration is assembled using peg fasteners 130 and holes for peg fasteners 132, in which the side of the sheet with peg fasteners 130 is pulled beneath the side of the sheet with holes for peg fasteners 132. The peg fasteners 130 insert into the holes for peg fasteners 132 as detailed in FIG. 17.

Figure 18:
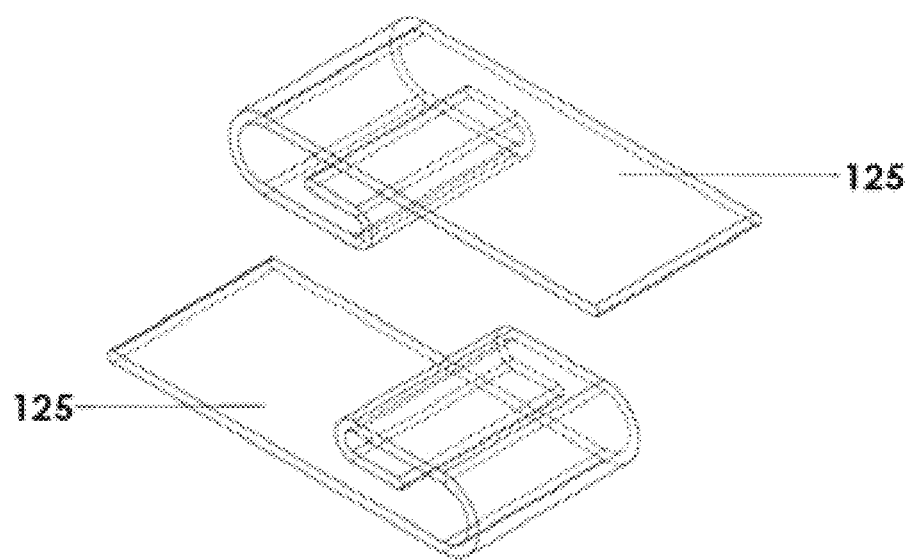
FIG. 18 is a perspective view of a curl and hook fastener system for cylindrical components.
Figure 19:
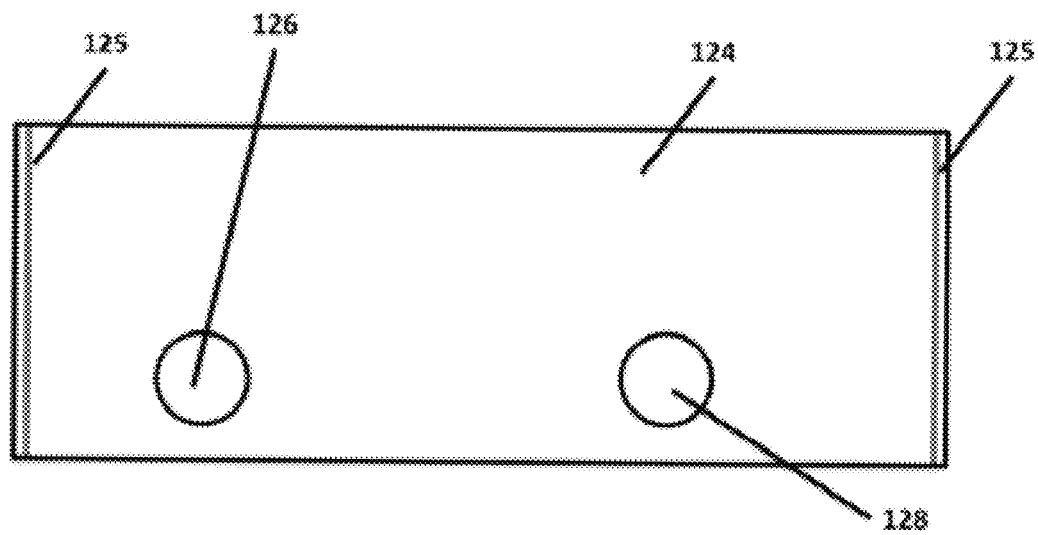
FIG. 19 is a top-down view of a cylindrical main housing with a curl and hook fastener system in an unrolled configuration.

FIG. 18 details a perspective view of the means of attaching a cylindrical main housing with curl-hook fasteners 200 in which the opposite ends are pulled inward and connected via curl-hook fasteners 125, similar to that employed in ductwork for heating/cooling applications. Cylindrical fuel and air intake apparatus openings 126 and 128 are featured and will receive opposite ends of the fuel and air intake apparatus upon assembly. FIG. 19 details the cylindrical main housing embodiment with curl-hook fasteners 200 in an unrolled configuration.

Figure 20:
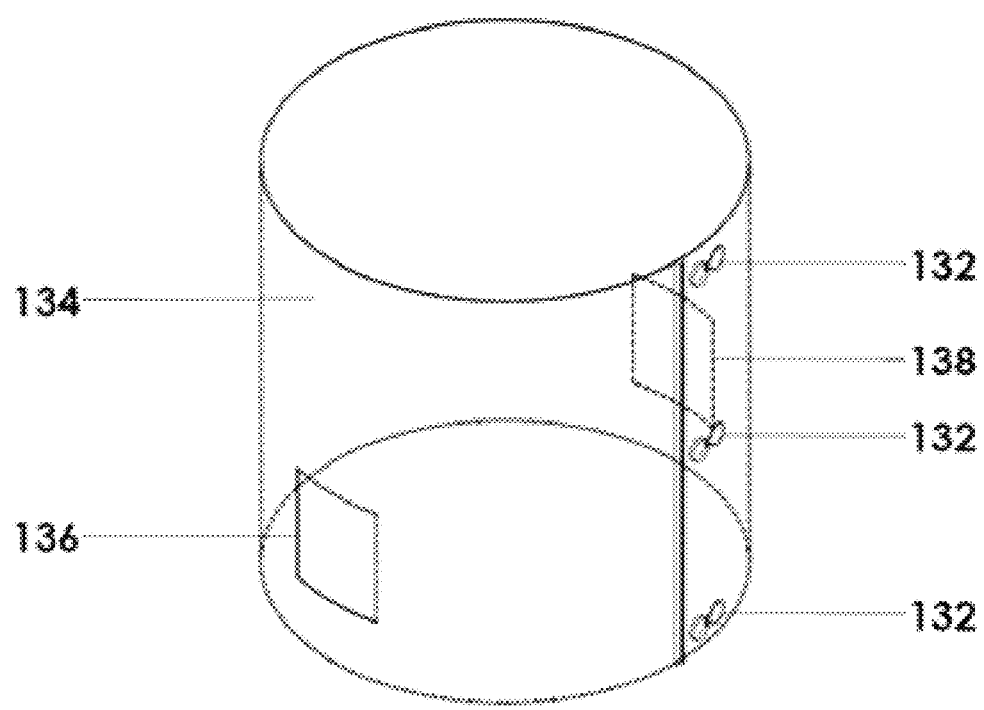
FIG. 20 is a perspective view of a cylindrical main housing with rectangular fuel and air intake apparatus openings in a rolled configuration.
Figure 21:
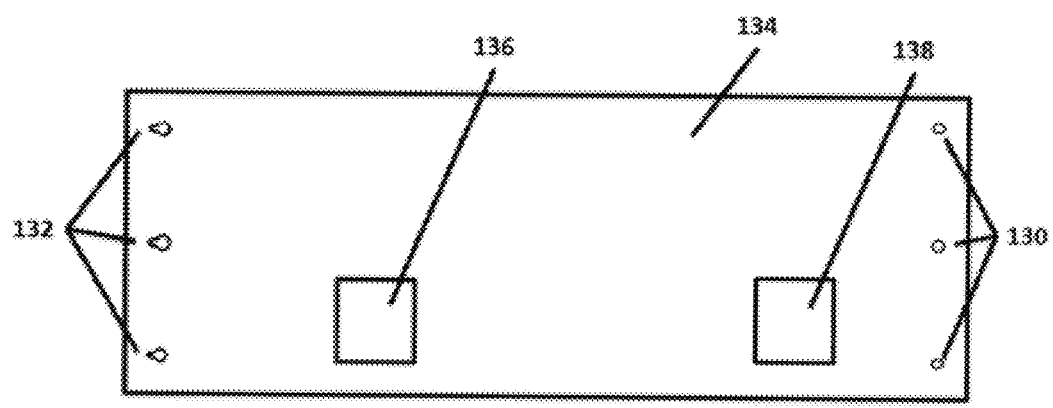
FIG. 21 is a top-down view of a cylindrical main housing with rectangular fuel and air intake apparatus openings in an unrolled configuration.

FIG. 20 details an alternate embodiment in which a cylindrical main housing 134 is employed with rectangular fuel and air intake apparatus openings 136 and 138 situated opposite one another when the sheet comprising the cylindrical main housing 134 is rolled into a cylinder. FIG. 21 details the cylindrical main housing 134 in an unrolled configuration.

Figure 22:
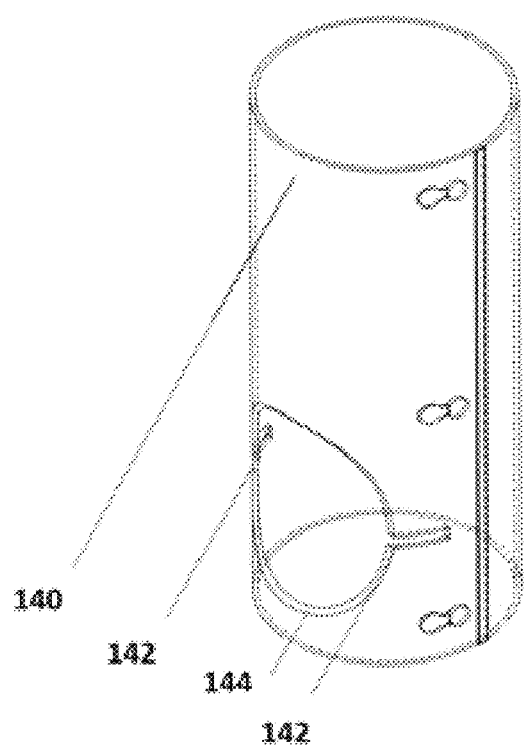
FIG. 22 is a perspective view of a cylindrical chimney apparatus in a rolled configuration.
Figure 23:
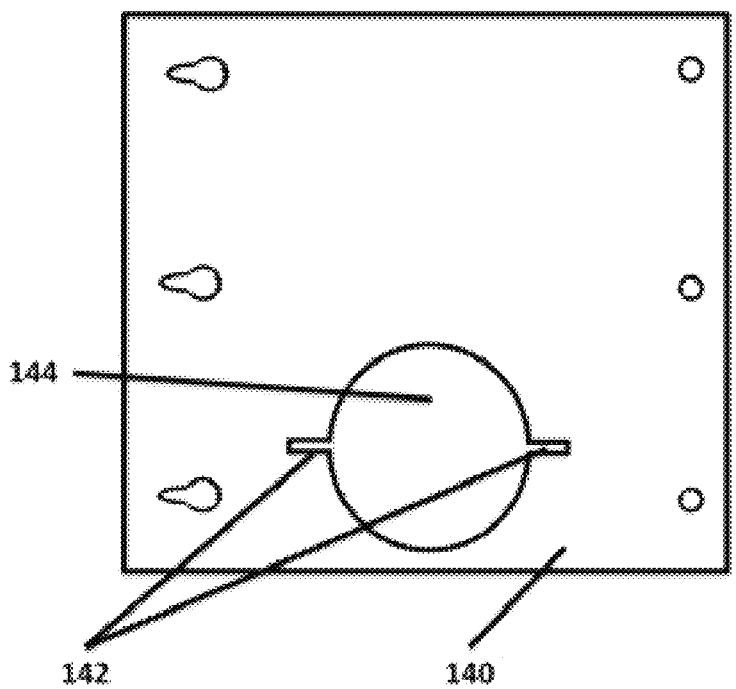
FIG. 23 is a top-down view of a cylindrical chimney apparatus section in an unrolled configuration.

FIG. 22 details an alternate chimney apparatus embodiment in which a cylindrical chimney apparatus 140 is employed. The cylindrical chimney apparatus fuel and air intake apparatus opening 144 is configured to accept the separator 106 within the separator slots 142. This chimney apparatus is constructed by fastening opposing ends of the unrolled configuration seen in FIG. 23. Both FIGS. 22 and 23 feature an opening for cylindrical fuel and air intake apparatus 144 as well as slots for a separator plate 142.

It will be apparent to those of ordinary skill in the art that this opening for cylindrical fuel and air intake apparatus 144 may or may not be symmetric, and may rather be configured to limit or direct air flow or fuel into the combustion chamber as desired. Likewise, it will be apparent to those of ordinary skill in the art that the cylindrical chimney apparatus 140 may be insulated by an appropriate material inserted into the cylindrical chimney apparatus 140 upon expansion or fixedly attached to the cylindrical chimney apparatus 140 wall.

Figure 24:
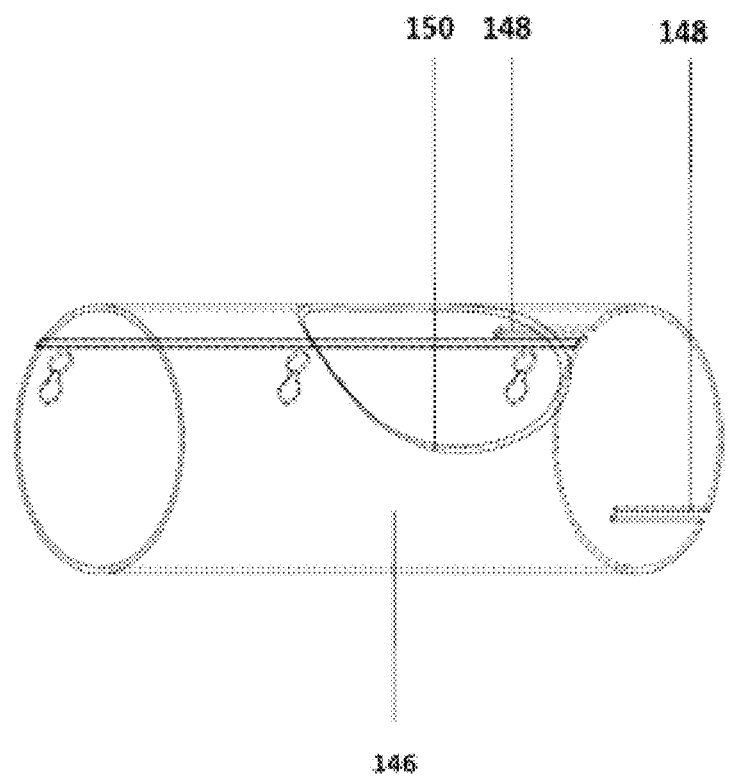
FIG. 24 is a perspective view of a cylindrical fuel and air intake apparatus in a rolled configuration.
Figure 25:
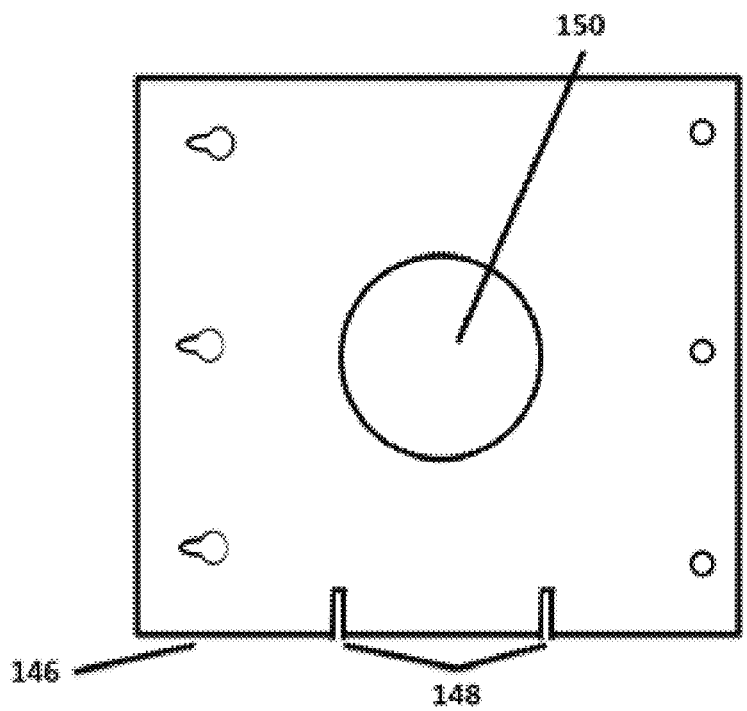
FIG. 25 is a top-down view of a cylindrical fuel and air intake apparatus in an unrolled configuration.

FIG. 24 is a perspective view of the cylindrical fuel and air intake apparatus 146 in a rolled configuration. This is constructed via the fastening of opposite ends of the unrolled configuration seen in FIG. 25. Both FIGS. 24 and 25 feature separator plate slots 148 as well as an opening for cylindrical chimney apparatus 150. The cylindrical fuel and air intake apparatus 146 and cylindrical chimney apparatus 140 assemble in a similar fashion to the non-cylindrical counterparts. That is, the cylindrical feel and air intake apparatus 146 is inserted into a cylindrical main housing with cylindrical fuel and air intake apparatus openings 124. The cylindrical chimney apparatus 140 is then inserted into the cylindrical fuel and air in take apparatus via the opening for the cylindrical chimney apparatus 150. The cylindrically configured embodiment is then operated in a manner identical to the $1^{st}$ and $2^{nd}$ embodiments.

Description and Operation—$4^{th}$ Embodiment
(FIGS. 26 to 29)

Figure 26:
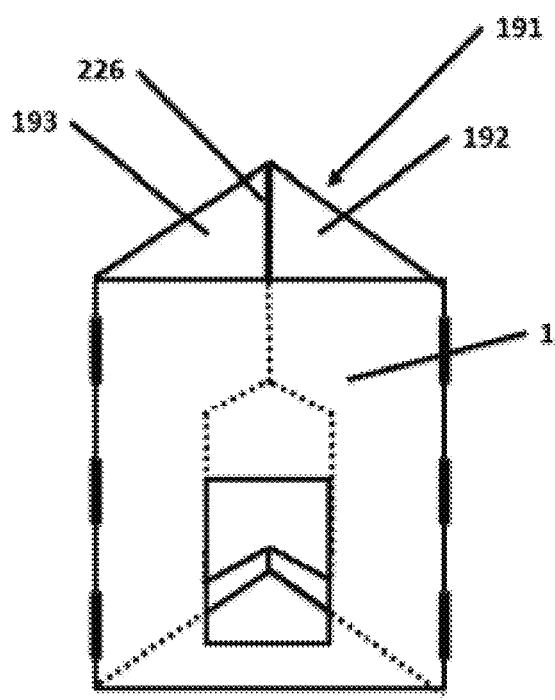
FIG. 26 is a perspective view of a triangular main housing with single rear fuel and air intake apparatus opening.

FIG. 26 details the triangular main housing with a single rear fuel and air intake apparatus opening 191. This housing is comprised of triangular main housing right rear panel with single fuel and air intake apparatus window 192 hingedly connected to front main housing panel 102. Front main housing panel 102 is also hingedly connected to triangular main housing left rear panel with single fuel and air intake apparatus window 193. The triangular main housing side panels 192 and 193 may be advantageously maneuvered into either a collapsed or expanded configurations according to preference. In this embodiment, the triangular main housing side panels 192 and 193 are attached to one another via a removable pin 224 through the top and down the length of a series of interlocking partial curls 226 at the panel edge. One embodiment of this mechanism is seen in FIGS. 57 to 60.

Those skilled in the art will note that any number of means of interlocking the two triangular main housing side panels 192 and 193 may be variously employed to secure the sides. These include interlocking loops or partial curls in the panel, attached bolts or spacers, or a series of interlocking slots and tabs in any number of configurations which mechanically join the triangular main housing side panels 192 and 193. Likewise those skilled in the art will note that removable pin 224 may consist a rod and a series of cylinders or approximately cylindrical elements either continuous with or attached to the sides of the component panels and joined by some rod, bolt, screw, or similarly functioning mechanism.

Figure 27:
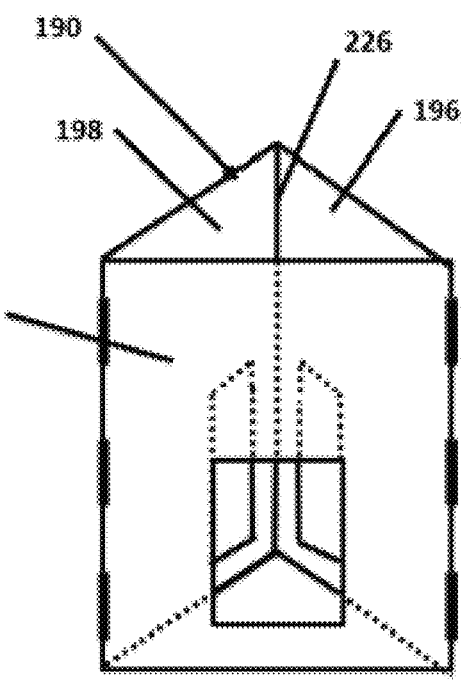
FIG. 27 is a perspective view of a triangular main housing with dual rear fuel and air intake apparatus openings.

Another embodiment of the invention is the triangular main housing with dual fuel and air intake apparatus windows 190 seen in FIG. 27. Triangular main housing right rear panel with dual fuel and air intake apparatus windows 196 and triangular main housing left rear panel with dual fuel and air intake apparatus windows 198 are both hingedly attached in this embodiment to the front main housing panel 102. In a manner similar to the embodiment shown in FIG. 26, the rear panels are attached to one another via a removable pin 224 inserted through the top and extending down the length of a series of interlocking partial curls 226 at the panel edges of the triangular main hosing right and left rear panels with dual fuel and air intake apparatus windows 196 and 198. One embodiment of this mechanism is seen in FIGS. 57 to 60.

Alternately, FIGS. 28 and 29 depict another embodiment of the triangular main housing design, namely a triangular main housing with folding half-panels. In this embodiment, one of the two rear side panels of FIG. 26 is replaced with two panels, triangular main housing rear half-panel 194 and triangular main housing front half-panel 195 hingedly attached to one another and both the front main housing panel 102 and a triangular rear main housing panel either 192 or 193, depending on which rear panel is replaced with the hinged panels. This embodiment enables the user to expand and construct the main housing structure from a collapsed configuration depicted in FIG. 29. This embodiment is advantageously movable between expanded or collapsed configurations as desired. The triangular main housing embodiments depicted in FIGS. 26 to 29 are then operated in a manner identical to the $1^{st}$, $2^{nd}$, and $3^{rd}$ embodiments.

Alternate Component and Main Housing
Configurations Description and Operation (FIGS.
30 to 62)

Figures 30, 31:
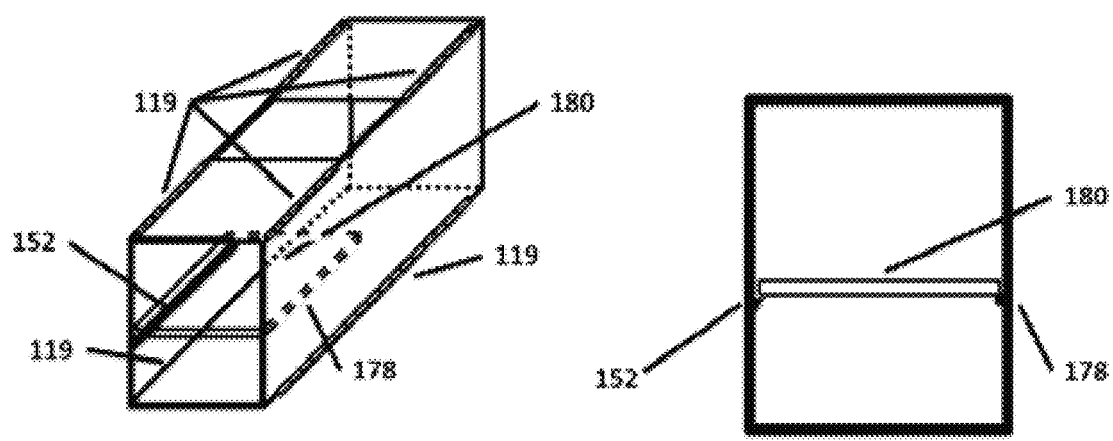
FIG. 30 is a perspective view of a fuel and air intake apparatus with a separator plate hingedly attached to one side of a fuel and air intake apparatus and a separator plate catch on a fuel and air intake apparatus side opposite a hinge.
FIG. 31 is a top plan view of a fuel and air intake apparatus with a hinged separator plate.

A fuel and air intake apparatus with hinged separator plate 179 is seen in FIGS. 30 to 31. In this embodiment, the separator plate 180 is hingedly attached to one side of the fuel and air intake apparatus via a hinge for separator plate 178. This configuration omits the need for separate insertion of a separator plate, and instead utilizes a separator plate catch 152 to stabilize the separator plate 180 on the side of the fuel and air intake apparatus opposite the hingedly connected side. The expanded perspective view is seen in FIG. 30, while the end-on view of the expanded fuel and air intake apparatus with hinged separator plate 180 is seen in FIG. 31. This embodiment can be advantageously expanded and collapsed according to preference.

Figure 32:
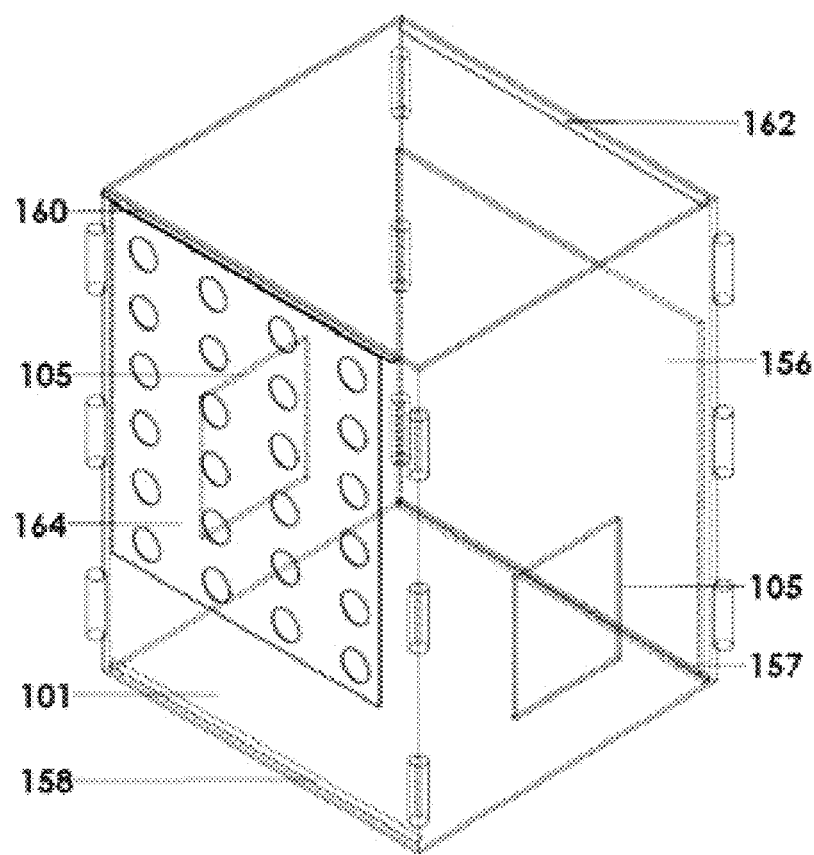
FIG. 32 is a perspective view of a main housing in an expanded configuration with a hinged base plate, a hinged base plate catch, a hinged cook surface plate, and a hinged cook surface plate catch.

An alternate main housing embodiment is detailed in FIG. 32. In this embodiment, a hinged base plate 156 is hingedly attached to a side panel of the main housing via a housing base plate hinge 157. A base plate catch 158 is located opposite the hinged side of the hinged base plate in this embodiment. It will be apparent to those of ordinary skill in the art that the base plate may be attached to the main housing by way of any number of means, including a tab and slot system in a manner similar to those seen in FIG. 52, tongues and grooves in a manner similar to those seen in FIG. 13, or by any means achieving the same purpose.

The attachment of a hinged base plate 156 to the main housing 101 serves several functions. The base plate allows for an insulated version of the stove to be transported from one location to another without requiring re-insulation. That is, the fuel and air intake apparatus 114 and chimney apparatus 110 can be insulated with dirt, rocks, etc., and this insulation will not fall out of the bottom of the stove during transport.

Figure 33:
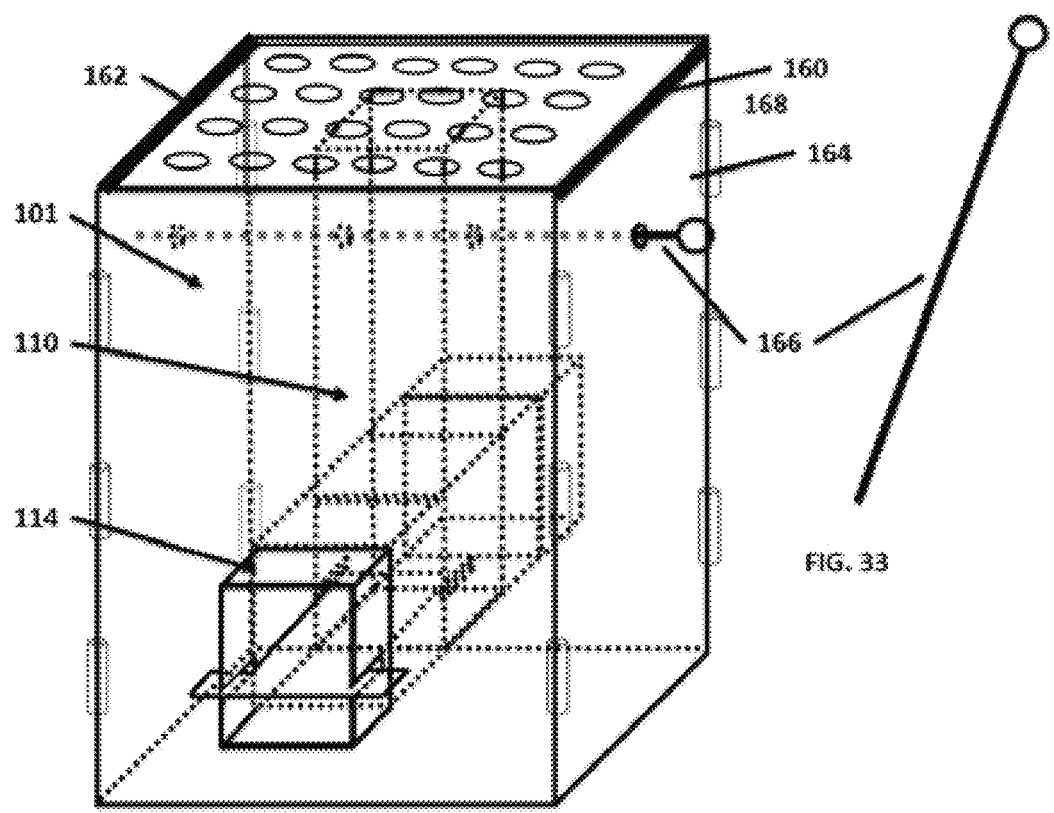
FIG. 33 is a perspective view of one embodiment of a main housing and chimney apparatus in which a stability rod is inserted into a main housing and chimney apparatus sections.

FIG. 33 details one embodiment of a means of stabilizing the chimney apparatus within the main housing. In this embodiment, a stability rod 166 is inserted through both the main housing 101 and the chimney apparatus 110 via a series of holes for stability rod 168. It will be apparent to those of ordinary skill in the art that stability rod may be oriented in any direction, may be one rod or numerous rods, or may be replaced with a wire harness or similar implement, to effectively achieve the same purpose.

Figure 34:
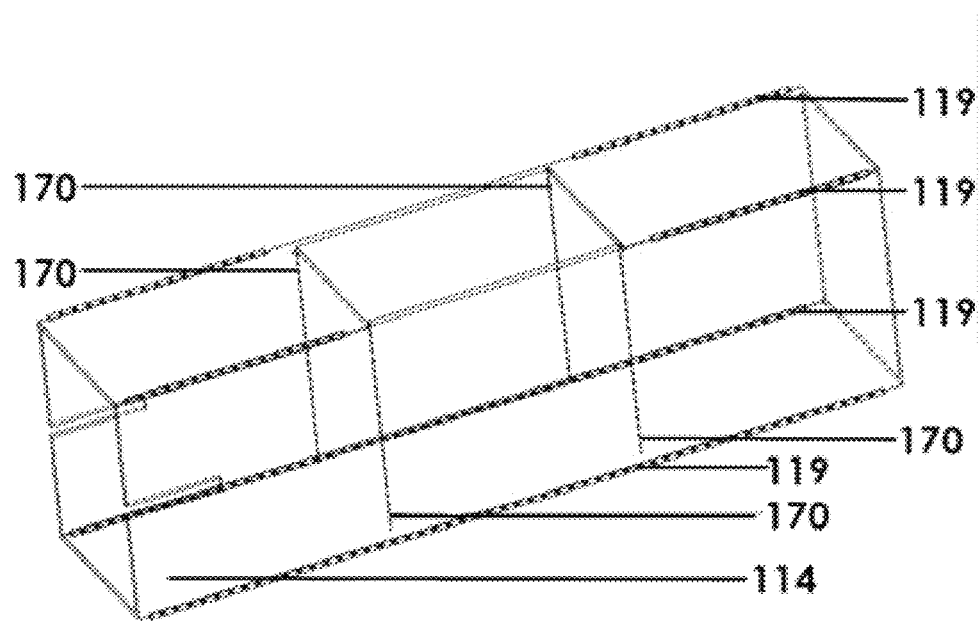
FIG. 34 is a perspective view of a fuel and air intake apparatus with vertically configured stability rods.

FIG. 34 details one embodiment of another means of stabilizing the chimney apparatus within the main housing. In this embodiment, a series of stability guide rails 170 are situated vertically within the fuel and air intake apparatus 114 which serve to effectively limit the range of motion available to the chimney apparatus 110 upon insertion into the fuel and air intake apparatus 114. It will be apparent to those of ordinary skill in the art that stability guide rails 170 may consist of stainless steel rounds, thin strips of stainless steel, ceramic rods or any alternate material suitable for the high temperature conditions in close proximity to the combustion chamber. These may be oriented vertically within the fuel and air intake apparatus 114 at the four corners where the fuel and air intake apparatus 114 meets the chimney apparatus 110 as depicted in FIG. 34. Similarly, it will be apparent to those of ordinary skill in the art that these may be oriented vertically within the fuel and air intake apparatus 114 and correspond to slits or cuts in the lower chimney apparatus section which serve to vertically align and maintain the chimney apparatus 110 orientation relative to the fuel and air intake apparatus 114.

Figure 35:
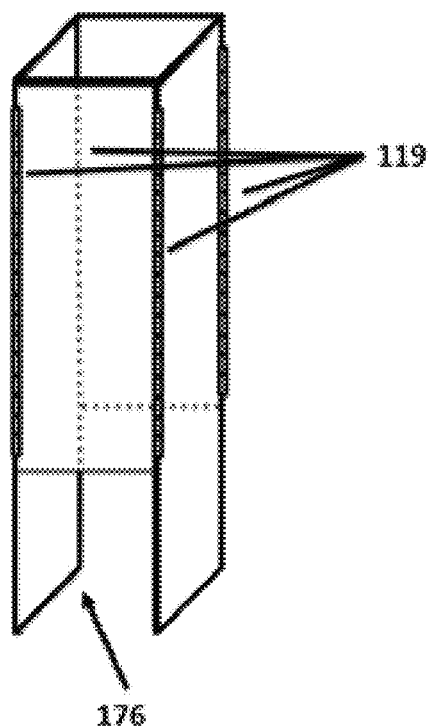
FIG. 35 is a perspective view of a chimney apparatus with front and rear fuel and air intake apparatus openings.

FIG. 35 details one embodiment of a chimney apparatus with front and rear fuel and air intake apparatus openings 176. This embodiment differs from chimney apparatus 110 in that the chimney apparatus rear panel 111 is replaced with another chimney apparatus front panel 109. The panels comprising the walls of the chimney apparatus with front and rear fuel and air intake apparatus openings 176 are hingedly attached to one another in manner similar to the original chimney apparatus 110 embodiment. This embodiment would require dual separator plates of any embodiment, to enable two-sided rocket stove operation. Furthermore, it will be apparent to those of ordinary skill in the art that one side or some portion of one side of the chimney apparatus front panel 109 may extend further down the length of the chimney apparatus, creating an asymmetrical opening in to the chimney apparatus for fuel and air from the fuel and air intake apparatus.

Figure 36:
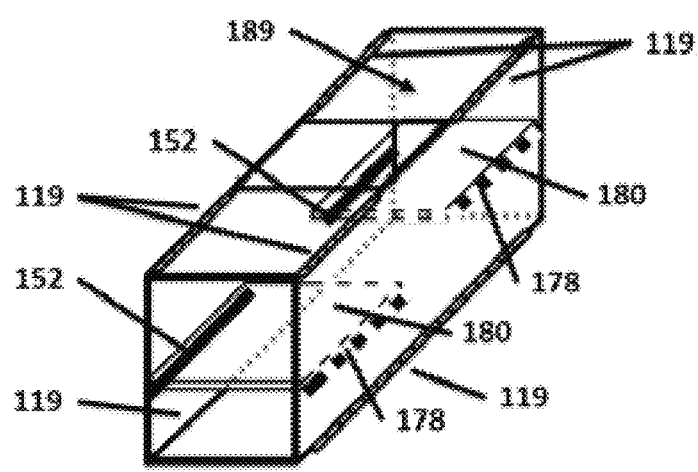
FIG. 36 is a perspective view of one embodiment of a fuel and air intake apparatus with hinged separator plates in the front and rear of the fuel and air intake apparatus.

FIG. 36 offers a perspective view of a fuel and air intake apparatus with dual separators 189 with two hinged separator plates 180, two hinges for separator plates 178, and two separator plate catches 152. It will be apparent to those of ordinary skill in the art that the dual separator fuel and air intake apparatus 189 could be comprised of dual separator plates 106 with accompanying fuel and air intake apparatus separator slots 116. Furthermore, it will be apparent to those of ordinary skill in the art that the dual separator plates 106 in this embodiment, as with any separator embodiment, could be comprised of a separator plate supported not by slots but by approximately 90° turns in opposing ends of the separator plate which act as legs or supports for the plate. One such embodiment is depicted as separator plate with legs 228 in FIG. 49.

FIG. 37 describes an alternate fuel and air intake apparatus embodiment, depicting a fuel and air intake apparatus with perforated grate section 188. In this depiction, two catch rods for sliding grate 186 are depicted running parallel to the bottom panel and attached to the side panels of the fuel and air intake apparatus with perforated grate section 188. FIG. 38 depicts the embodiment with the sliding grate for fuel and air intake apparatus 182 inserted. The operation of this embodiment involves the sliding grate lever for fuel and air intake apparatus 184, which may be moved advantageously towards or away from the front of the fuel and air intake apparatus with perforated grate section 188. This movement may be perforated such that any ash or debris that may collect upon the sliding grate for fuel and air intake apparatus 182 can be either dropped or shaken through the aligned holes in the perforated grate section 188 and sliding grate for fuel and air intake apparatus 182.

It will be apparent to those of ordinary skill in the art that the perforated grate may be constructed out of hardware cloth or expanded steel welded to the stainless steel base plate of the fuel and air intake apparatus with perforated grate section 188. Similarly, it will be apparent to those of ordinary skill in the art that the perforated grate may consist merely of a plurality of holes drilled in the center of the lower (bottom) plate of the fuel and air intake apparatus with perforated grate section 188. The sliding grate lever for fuel and air intake apparatus 184 may be comprised of a rod composed of stainless steel or any material sufficient to withstand the temperatures involved with the stove's operation. Furthermore, the sliding grate lever for fuel and air intake apparatus 184 may end in a loop for ease of use as depicted in FIG. 38, or it may otherwise end in any shape suitable for the purpose of facilitating movement of the sliding grate for fuel and air intake apparatus 182. It will be apparent to those of ordinary skill in the art that the sliding grate for fuel and air intake apparatus 182 may extend the length of the lower panel of the fuel and air intake apparatus with perforated grate section 188 and may or may not be terminated with a sliding grate lever for fuel and air intake apparatus 184.

Figure 39:
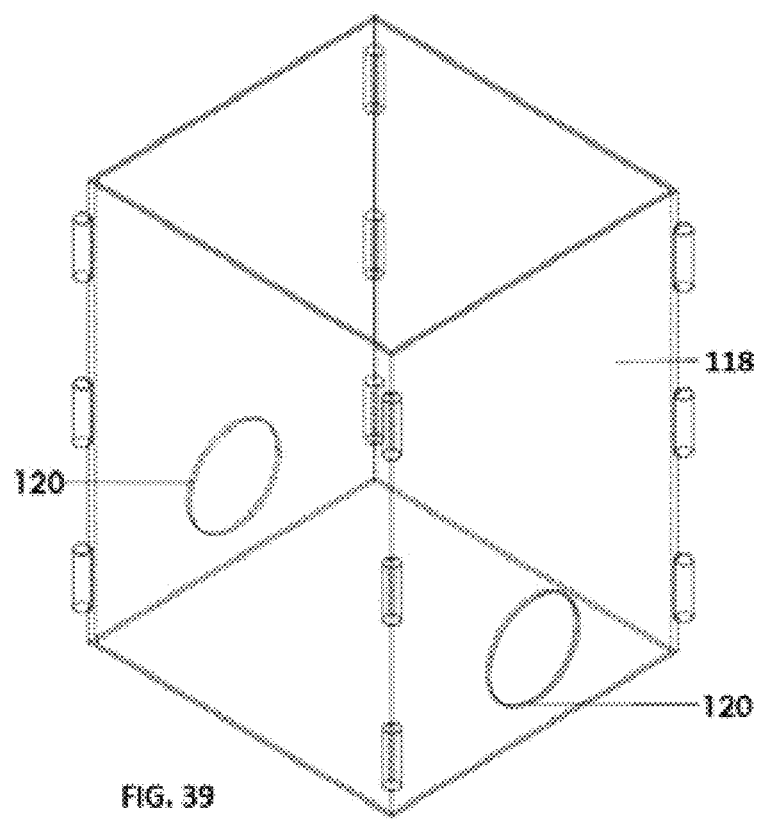
FIG. 39 is a perspective view of the rectangular main housing with cylindrical fuel and air intake apparatus openings in expanded configuration.

FIG. 39 depicts one embodiment of a rectangular main housing with cylindrical fuel and air intake apparatus openings 118. This embodiment maintains the hingedly collapsible main housing while allowing for a cylindrical fuel and air intake apparatus 146 to be inserted into either of the cylindrical fuel and air intake apparatus openings 120. It will be apparent to those of ordinary skill in the art that the rectangular main-housing with cylindrical fuel and air intake apparatus openings 118 may be connected by several hinges in as in FIG. 39, or variously with continuous hinges, sections of continuous (aka piano) hinges, or implements serving the function of hinges.

Figure 40:
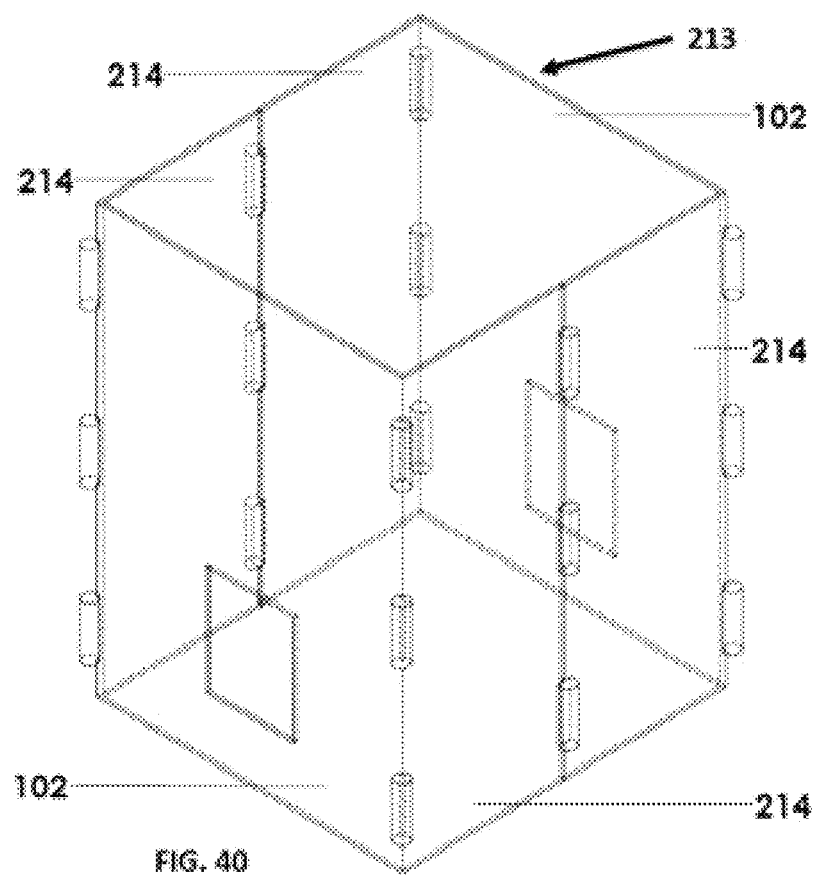
FIG. 40 is a perspective view of a rectangular main housing with dual folding side panels in an expanded configuration.
Figure 41:
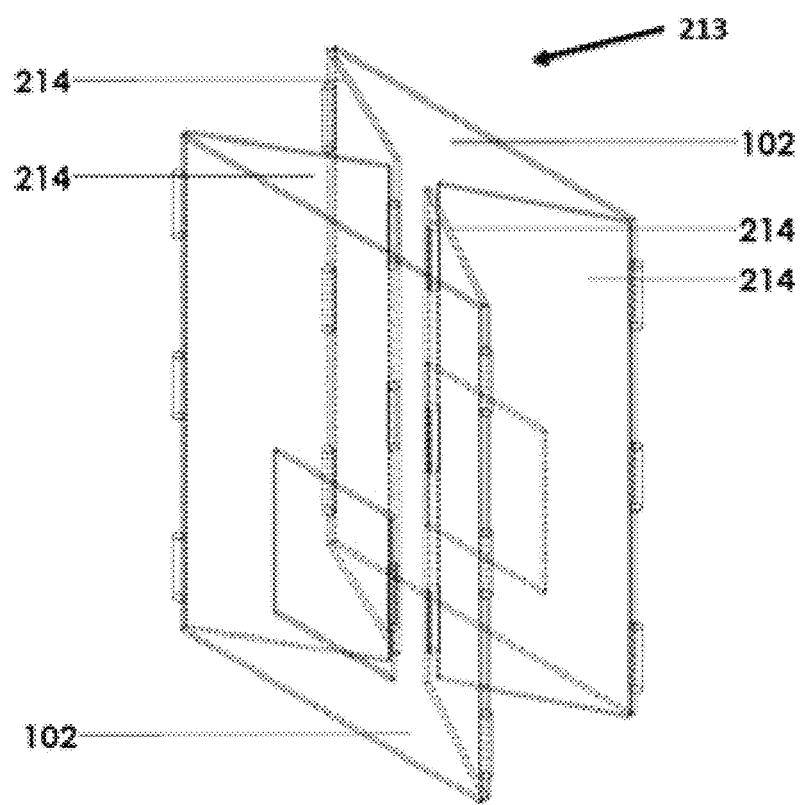
FIG. 41 is a perspective view of a rectangular main housing with dual folding side panels in a partially collapsed configuration.

Another embodiment of a rectangular main housing allows for the collapse of the main housing without the need for a second fold utilized in the main housing 101 and depicted in FIG. 40. This embodiment depicts a rectangular main housing with dual folding side panels 213. This embodiment employs a bifurcation of the side panels of the main housing 101, in which said main housing hinged half-panel 214 is hingedly connected to both another main housing hinged half-panel and either a front or rear main housing panel 102. It will be apparent to those of ordinary skill in the art that the main housing hinged half-panels may be connected by several hinges in as in FIG. 39, or variously with continuous hinges, sections of continuous (aka piano) hinges, or implements serving the function of hinges. A partially collapsed depiction for the rectangular main housing with dual folding side panels 213 is seen in FIG. 41.

Figure 42:
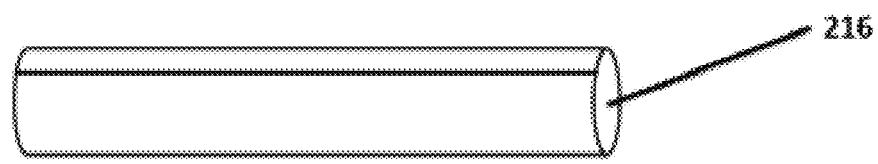
FIG. 42 is a perspective view of a cylindrical gravity fed fuel and air intake apparatus.
Figure 43:
FIG. 43 is a perspective view of a rectangular gravity fed fuel and air intake apparatus.
Figure 44:
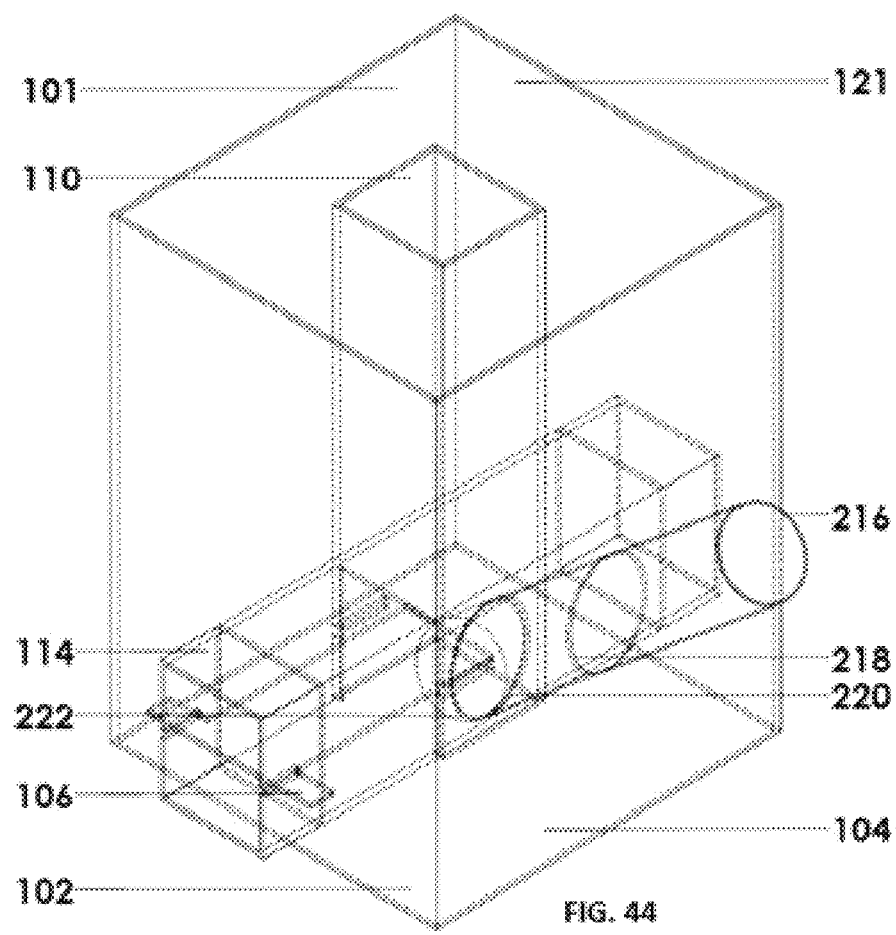
FIG. 44 is a perspective view of a variation of the first embodiment in assembled configuration with a cylindrical gravity fed fuel and air intake apparatus.

Another alternate embodiment of the folding rocket stove concept involves an auxiliary fuel and air intake apparatus which augments the main fuel and air intake apparatus 114 by providing another means of fuel delivery to the combustion chamber. In this embodiment, the auxiliary gravity-fed fuel and air intake apparatus may be either cylindrical or rectangular. The auxiliary cylindrical gravity-fed fuel and air intake apparatus 216 is depicted in FIG. 42, while the auxiliary rectangular gravity-fed fuel and air intake apparatus 217 is depicted in FIG. 43. One embodiment of the employment of these auxiliary gravity-fed fuel and air intake apparatus is depicted in FIG. 44. In this embodiment, a cylindrical auxiliary gravity-fed fuel and air intake apparatus is depleted as protruding from the top right side of the main housing via the main housing gravity fuel and air intake apparatus cylinder opening 218. Similarly, the auxiliary cylindrical gravity-fed feel and air intake apparatus 216 passes through both the fuel and air intake apparatus opening for auxiliary gravity-fed feel and air intake apparatus 218 and the chimney apparatus opening for auxiliary gravity-led fuel and air intake apparatus 222 in this embodiment.

It will be apparent to those of ordinary skill in the art that the embodiment depicted in FIG. 44 may be composed of rectangular rather than oval openings to fit the auxiliary rectangular gravity-fed fuel and air intake apparatus 217 in place of the auxiliary cylindrical gravity-fed fuel and air intake apparatus 216. Likewise, it will be apparent to those of ordinary skill in the art that the embodiment depicted in FIG. 44 may contain an auxiliary gravity-fed fuel and air intake apparatus oriented in any direction. That is, the auxiliary cylindrical gravity-led feel and air intake apparatus 216 depicted in FIG. 44 may be oriented to the left, to the front, or to the rear of the main feel and air intake apparatus 114 rather than the right. Likewise, it will be apparent to those skilled in the art that there may be one or several auxiliary gravity-fed fuel and air intake apparatuses, with accompanying openings in the main housing 101, chimney apparatus 110, and fuel and air intake apparatus 114.

Figure 45:
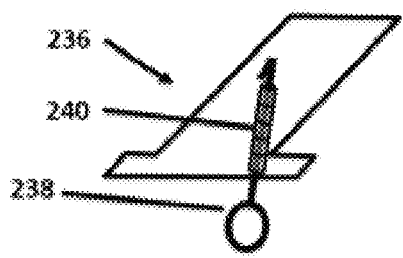
FIG. 45 is a perspective view of a separator plate with an air vent adjustment rod attached to the lower surface.
Figure 46:
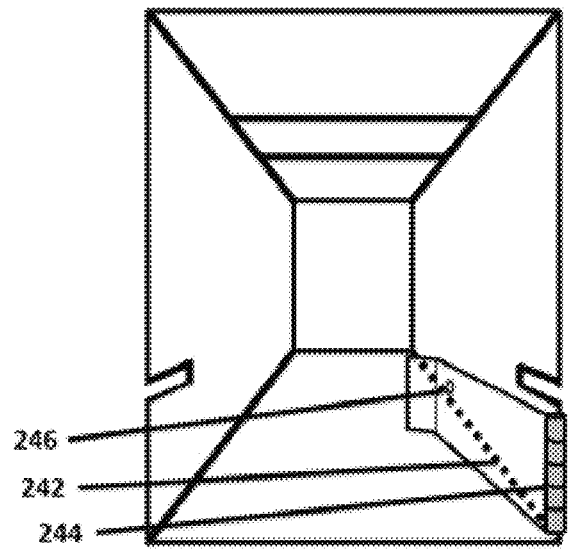
FIG. 46 is a perspective view of a fuel and air intake apparatus with an air vent adjustment plate hingedly attached to one side of a fuel and air intake apparatus.
Figure 47:
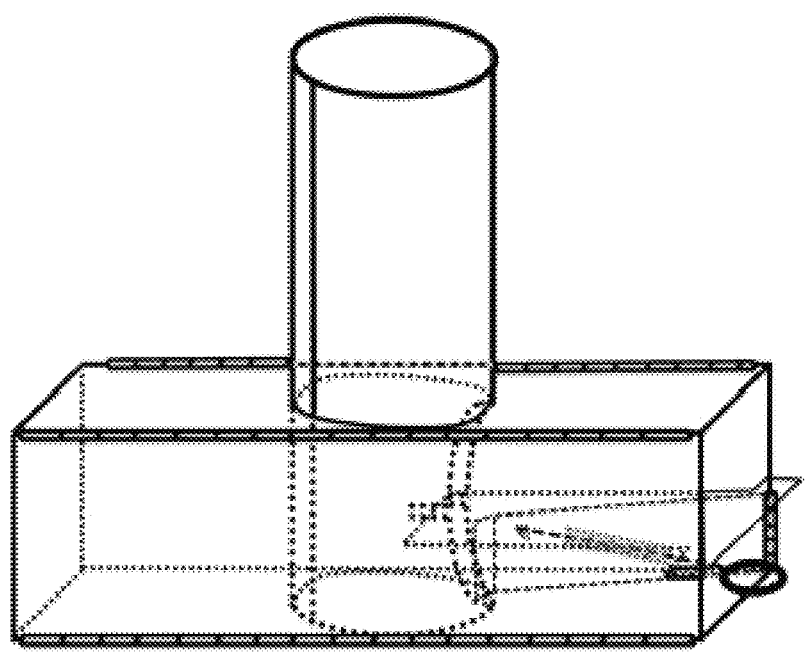
FIG. 47 is a perspective view of one embodiment of a cylindrical chimney apparatus inserted into a fuel and air intake apparatus with the air vent adjustment plate and separator with an air vent adjustment rod in an assembled configuration.

In FIGS. 45, 46, and 47 an alternate embodiment of a separator and fuel and air intake apparatus that enables preferential limitation of the air draft through the fuel and air intake apparatus is provided. FIG. 45 depicts a separator with air vent adjustment rod 236. This embodiment provides an air vent adjustment rod 238 as well as a slide tube for air vent adjustment rod 240. This slide tube provides the means of attachment of the air vent adjustment rod 238 to the separator 106. FIG. 46 provides an embodiment of a fuel and air intake apparatus with adjustable air vent 235 with an air vent adjustment plate 242 hingedly attached to the fuel and air intake apparatus with adjustable air vent 235 via a continuous hinge for air vent adjustment plate 244 and hole catch for air vent adjustment rod 246.

FIG. 47 depicts the insertion of the air vent adjustment rod 238 into the hole catch for air vent adjustment rod 246, whereby the air vent adjustment rod 238 may be advantageously moved towards and away from the operator by passing through the slide tube for air vent adjustment rod 240, an action which will correspondingly move the air vent adjustment plate 242 towards and away from the operator. This movement, limits or expands the available space for the air draft past the air vent adjustment plate 242 during stove operation.

It will be apparent to those of ordinary skill in the art that the embodiment depicted in FIGS. 45 through 47 may utilize a weld to attach the slide tube for air vent adjustment rod to the separator plate 106, although any number of alternate means of attachment may be employed, including a strip of metal and screws directed through the separator plate and metal fastening strip, a series of such fastening strips, or any similar means achieving the same end.

Figure 48:
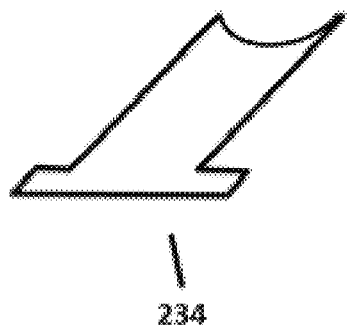
FIG. 48 is a perspective view of one embodiment of a separator plate with a curved end.
Figure 49:
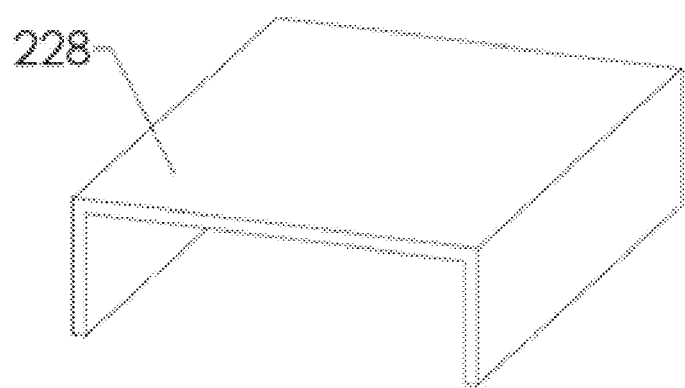
FIG. 49 is a perspective view of one embodiment of a separator plate with bent legs.

FIGS. 48 and 49 depict alternate separator embodiments. FIG. 48 depicts a separator plate with parabolic edge 234. Such an embodiment inserts into the fuel and air intake apparatus separator slot 116 as well, as the chimney apparatus separator slot 112 as taught in earlier embodiments, but recedes from the combustion chamber in a concave manner to allow for earlier direct contact between air from the bottom section of the fuel and air intake apparatus 114 and the fuel. FIG. 49 depicts an alternate embodiment of a separator plate in which the plate is bent at the edges parallel to the walls of the fuel and air intake apparatus 114 to form legs upon which the separator rests. This embodiment obviates the need for a chimney apparatus separator slot 112 and fuel and air intake apparatus separator slot 116, although what this design gains in simplicity it sacrifices somewhat for volume, since the legs are not collapsible.

Figure 50:
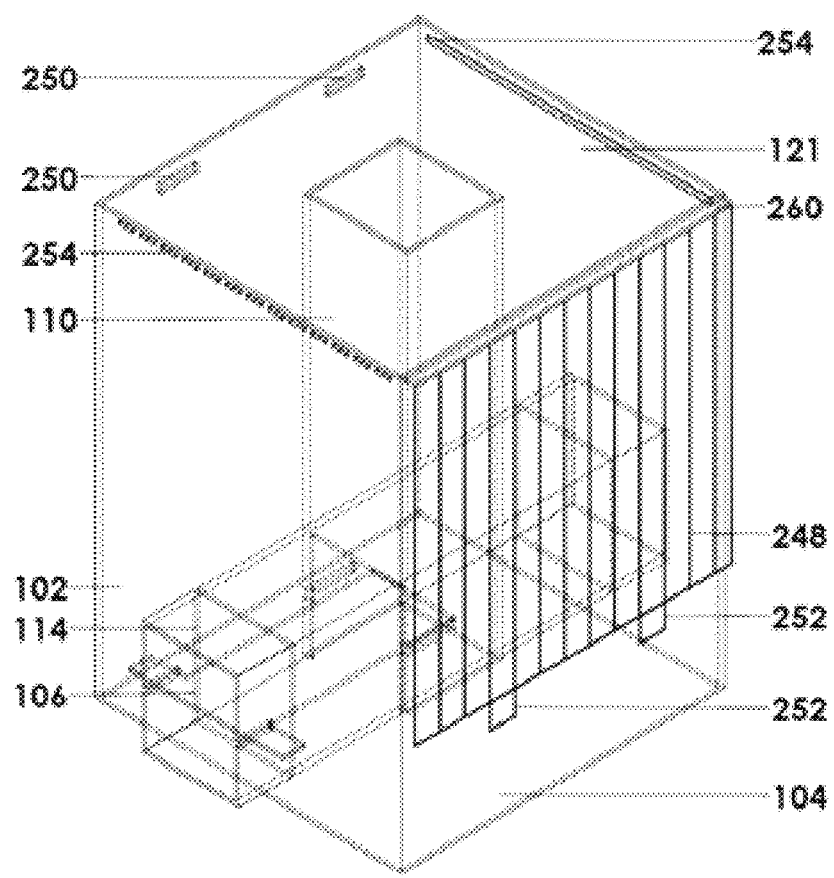
FIG. 50 is a perspective view of an assembled configuration with a grill surface including grill support rails, grill tabs, and slots for grill tab insertion.

An alternate depiction of a cook surface is depicted in FIG. 50, in which a hinged cook surface grate 248 is hingedly attached to a main housing 101 via a hinge for cook surface plate 160. In this embodiment, the hinged cook surface grate 248 is supported by a pair of grill support rods 254. Furthermore, this embodiment features a pair of holes and tabs locking the hinged cook surface grate 248 into the main housing 101. In this embodiment, the hinged cook surface tabs 252 insert into the holes for hinged cook surface grate tabs 250.

It will be apparent to those of ordinary skill in the art that any number of holes and tabs may be employed in any or all of the remaining main housing panels, rather than the two depicted in the opposite panel as depicted in FIG. 50. Likewise, it will be apparent to those of ordinary skill in the art that the hinged cook surface grate 248 may be supported by any number of possible variants of this design, to include tabs or posts extending from the hinged cook surface grate 248 and resting on the top of the main housing panels 102, 103, 104, or 121.

Figure 51:
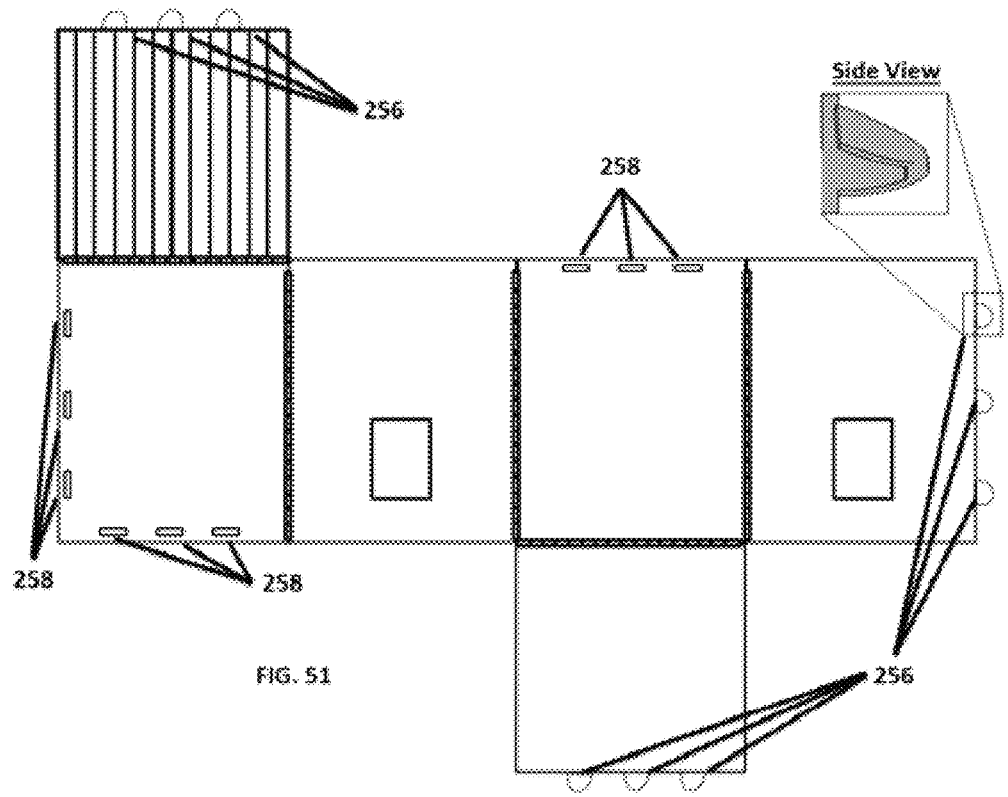
FIG. 51 is a perspective view of one embodiment of a main housing in which main housing panels are hingedly attached to one another and which is assembled using a tab and slot system.

An alternate main housing configuration is depicted in FIG. 51, in which a folding panel main housing with tab/slot assembly system 260 are hingedly connected as shown. The panels assemble via a tab and slot system, whereby the tabs for tab/slot assembly 256 are inserted into the slots for tab/slot assembly 258 by folding each panel at right angles to form a right rectangular parallelepiped.

It will be apparent to those of ordinary skill in the art that any number of tabs and slots may be employed in place of those depicted in FIG. 51 for any or all of the main housing panels, requiring either tabs or slots in any number or configuration. Furthermore, it will be apparent to those of ordinary skill in the art that any geometrical configuration of tab or slot that serves the noted purpose can be substituted for the particular embodiment taught in FIG. 51.

Figure 52:
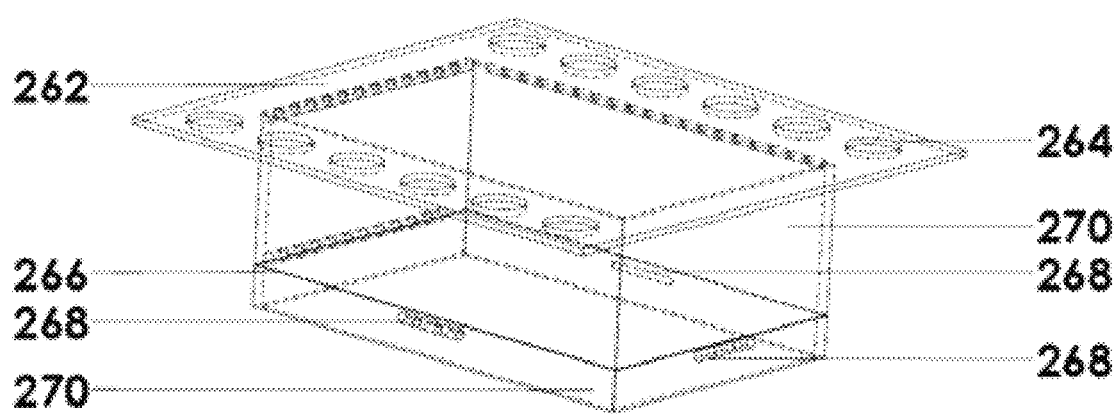
FIG. 52 is a perspective view of one embodiment of a cook plate with re-drafter box comprised of a cook plate surface and hinged re-drafter panels assembled via re-drafter wire harness, panel lock catch tabs, and re-drafter wire harness hinge.
Figure 53:
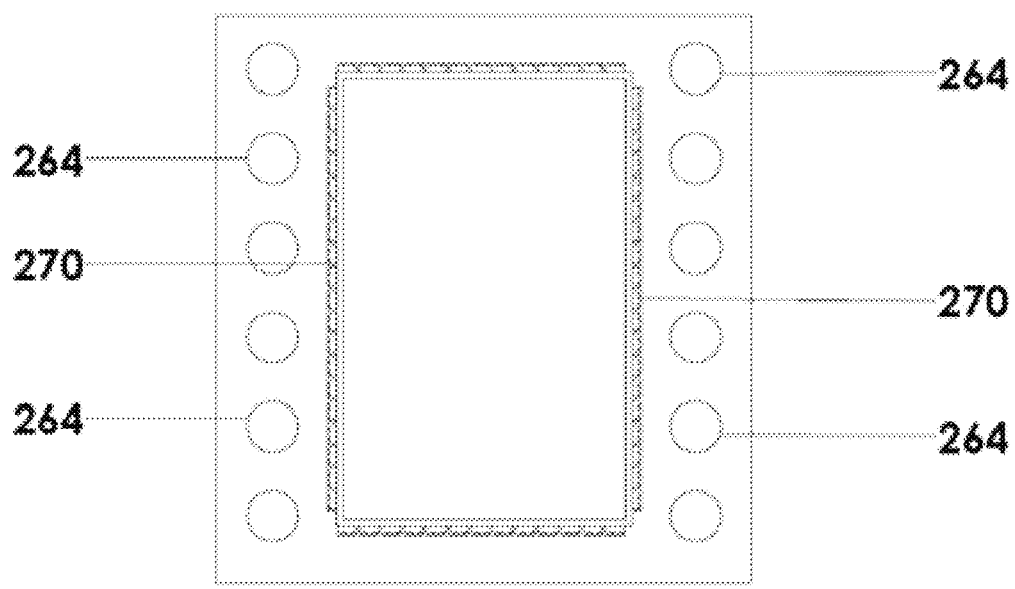
FIG. 53 is a top-down view of one embodiment, of a re-drafter comprised of a cook plate surface with a re-drafter box to be situated above chimney apparatus.

An alternate embodiment involving the cook surface and/or the space between the chimney apparatus and the cook surface is seen in FIG. 52. In this embodiment, the cook plate with re-drafter box 262 is comprised of preferably four approximately planar plates, preferably comprised of austenitic steel to better withstand the stove operating temperatures, hingedly attached to the underside of a cook plate, these four hinged re-drafter panels 270 may be advantageously moved between a collapsed and expanded configurations. The expanded configuration of hinged re-drafter panels 278 is maintained, in this embodiment, by way of a re-drafter wire harness 266 and a series of wire harness catch tabs 268 positioned along the hinged re-drafter panels 270 in such a manner as to enable the re-drafter wire harness 266 to securely maintain the re-drafter box 262 in an expanded configuration. This may be accomplished via a friction hold between the wire harness and the tab. Alternately, the wire harness catch tabs 268 may be configured in such a manner as to enable a tension hold between the two hinged re-drafter panels 270 adjacent to the hinged re-drafter panel 270 with the re-drafter wire harness hinge 272 and the hinged re-drafter panel 270 opposite the hinged re-drafter panel 270 with the re-drafter wire harness hinge 272.

Figure 54:
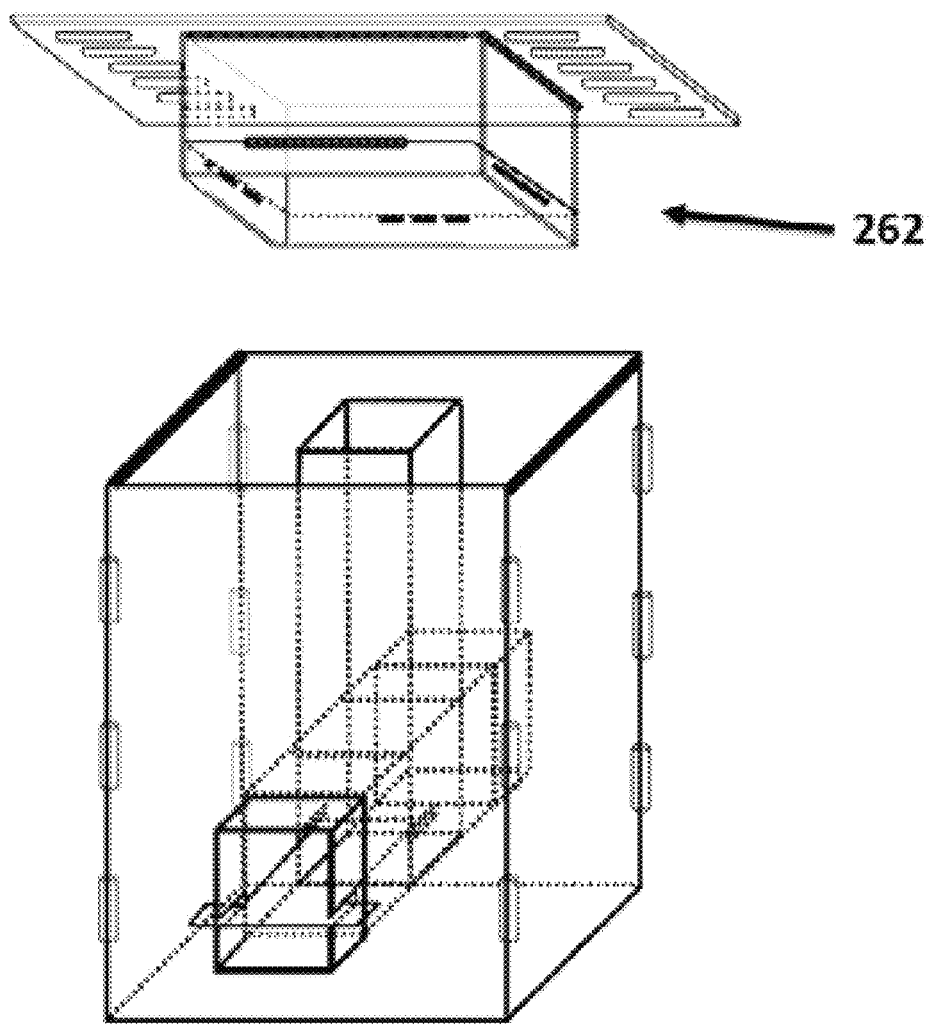
FIG. 54 is a perspective view of one embodiment of a re-drafter comprised of a cook plate surface with a re-drafter box positioned above an assembled collapsible biomass stove.

This embodiment of the re-drafter box with cook plate attachment 262 is intended to be placed upon the collapsible rocket stove after the stove has reached operating temperature. At this point, the re-drafter box with cook plate attachment 262 will be constructed in an expanded configuration using the re-drafter wire harness 266 and the wire harness catch tabs 268. The re-drafter box with cook plate attachment 262 is then placed on top of the main housing 101, centered on the center of the chimney apparatus 110 in this embodiment. The relative positions of the re-drafter box with cook plate attachment 262 and the main housing 101 of a constructed collapsible rocket stove is depicted in FIG. 54.

Once the re-drafter box with cook plate attachment 262 is lowered onto the rocket stove at operational temperatures, rising air and smoke from the combustion chamber will be re-directed down by the re-drafter box with cook plate attachment 262, delaying the interaction of the smoke and rising air with cooler ambient air. This will prolong the "secondary-burn" of the wood gases released by the fuel, enabling a more complete burn of volatile organic molecules, increasing the stove efficiency and decreasing smoke production. The exhaust from the stove will then pass beneath the skirt of the re-drafter box with cook plate attachment 262 and rise to escape through re-drafter vent holes 264 and into the ambient environment.

It will be apparent to those of ordinary skill in tire art that any number of re-drafter vent holes 264 may be employed in any orientation to permit passing of the stove exhaust into the ambient environment. Furthermore, it will be apparent to those of ordinary skill in the art that the hinged re-drafter panels 270 may be assembled via tabs and slots in a manner similar to that depicted in FIG. 51, pins and partial curls in a manner similar to those seen in FIGS. 57 to 60, or by means of any attachment mechanism suited for the purpose. Likewise, it will be apparent to those of ordinary skill in the art that the re-drafter box with cook plate attachment 262 may not be hinged at all but rather a permanently configured optional component to a collapsible rocket stove, though this attachment in a non-collapsible embodiment would have to trade simplicity of construction (without hinges) for inconvenience of transport, as a non-hinged version would not be collapsible. It will also be apparent to those of ordinary skill in the art that the re-drafter panels may be continuous and impermeable, or may rather be perforated with holes or "windows" through which the re-drafted exhaust may escape.

It will furthermore be apparent to those of ordinary skill in the art that the re-drafter box may be free-standing, designed to maintain its position upon either the ground or upon some interior insulation via several legs or via the extension of the hinged re-drafter panel 270. The re-drafter box with cook plate attachment 262 may likewise be employed with a chimney apparatus featuring vents along the upper walls of the chimney apparatus, allowing exhaust to escape the chimney apparatus from the upper sides of the chimney apparatus either in addition to or in place of exhaust exclusively through the top of the chimney apparatus 110 as detailed in other embodiments herein described.

Figure 55:
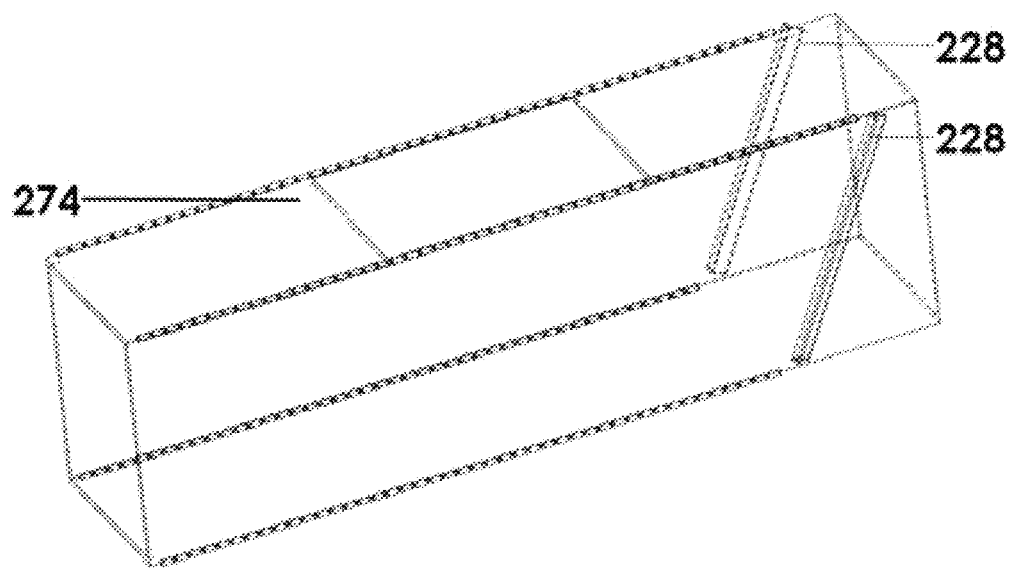
FIG. 55 is a perspective view of one embodiment of a gravity-fed fuel and air intake apparatus and gravity-fed fuel and air intake apparatus catch.

Another embodiment of the fuel and air intake apparatus component is seen in FIG. 55. In this embodiment, a fuel and air intake apparatus similar to the fuel, and air intake apparatus detailed in FIGS. 7 and 8, but of greater length, with an elongated chimney apparatus opening, and with gravity fuel and air intake apparatus catches 228 is detailed. This embodiment is the gravity-fed fuel and air intake apparatus 274. As with previous rectangular configurations, the gravity-fed fuel and air intake apparatus 274 is preferentially composed of planar or roughly planar panels hingedly attached to one another. The gravity-fed fuel and air intake apparatus can then be advantageously expanded or collapsed for use or transport according to preference. Likewise, it will be apparent to those of ordinary skill in the art that the gravity fuel and air intake apparatus catch 274 could be utilized with a fuel and air intake apparatus 114 for purposes of component stability.

Figure 56:
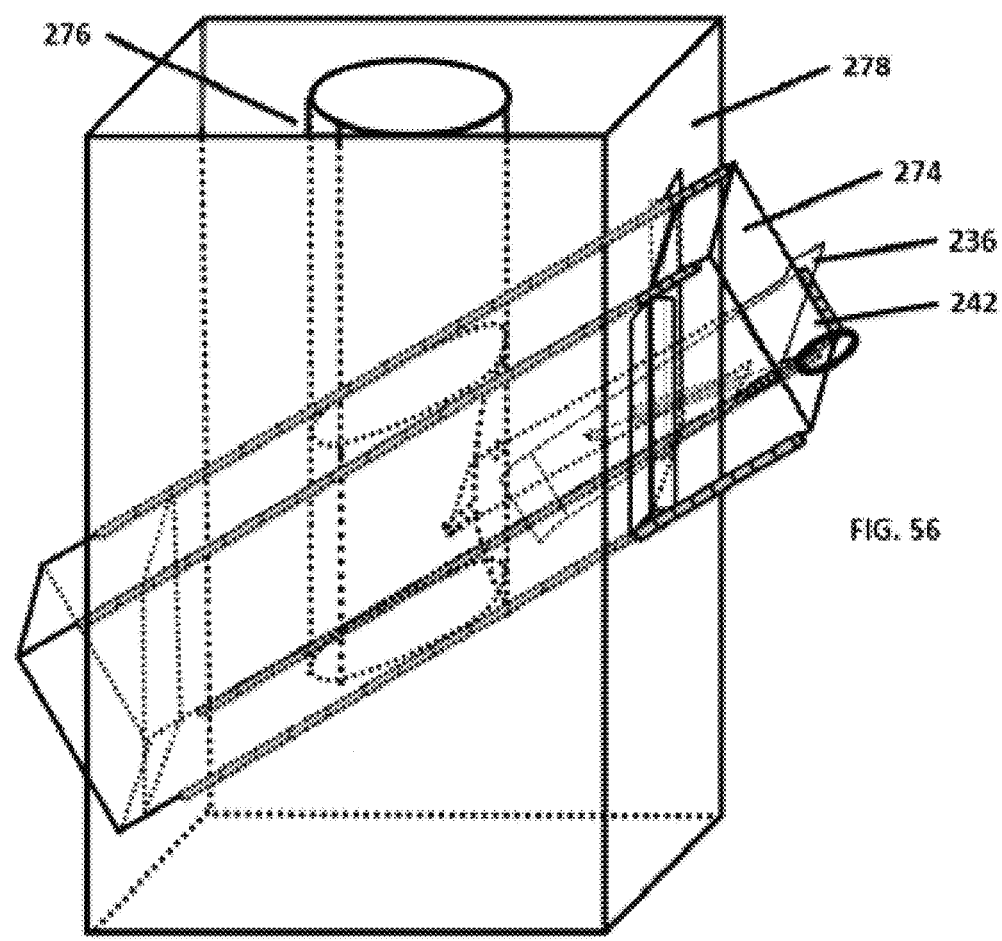
FIG. 56 is a perspective view of one embodiment of an assembled rocket stove with a gravity-fed fuel and air intake apparatus, gravity-fed chimney apparatus, separator with air vent adjustment rod, and air vent adjustment plate.

For this embodiment, a gravity-fed main housing 278 would be required, which would accommodate the gravity-fed fuel and air intake apparatus 274 and is detailed generally in FIG. 56. This embodiment would entail fuel and air intake apparatus openings to be offset from one another relative to the resting surface, with the fuel and air intake apparatus opening of higher elevation representing the opening into which the expanded configuration of the gravity-fed fuel and air intake apparatus 274 is inserted. The gravity-fed fuel and air intake apparatus 274 is then, fed into the gravity-fed main housing 278 until the gravity-fed fuel and air intake apparatus has passed through the lower fuel and air intake apparatus opening, and then caught upon outer surface of the gravity-fed main housing 278 by way of the two gravity-fed fuel and air intake apparatus catches 228 in this embodiment.

It will be apparent to those of ordinary skill in the art that the gravity-fed fuel and air intake apparatus may be oriented in any direction and through a wide array of angles relative to the ground, according to preference. It will be furthermore apparent to those of ordinary skill in the art that the gravity-fed fuel and air intake apparatus 274 may be comprised of geometries similar to those described for alterations upon the first described embodiment. That is, a cross section of the gravity-fed fuel and air intake apparatus 274 may be of a square, rectangular, triangular, oval, or circular geometry. Likewise, any number and orientation of gravity-fed fuel and air intake apparatus catches 228 may be alternately employed to accomplish a similar purpose.

Figure 57:
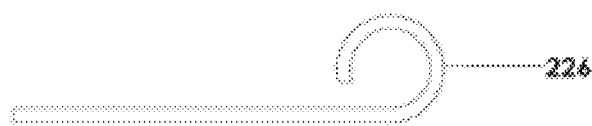

FIGS. 57 to 60 detail possible embodiments of panel edges curled upon themselves to form interlocking partial curls 226. A cross-sectional view of one such embodiment is seen in FIG. 57. It will be apparent to those of ordinary skill in the art that this type of interlocking mechanism may be substituted for any or all hinge components seen in the various embodiments of the invention. This embodiment of a "hinging" mechanism is preferentially continuous with, or otherwise physically attached to, the panels of the varied components of the invention. Panels to be joined would then be comprised of offset interlocking partial curls 226.

Figure 58:
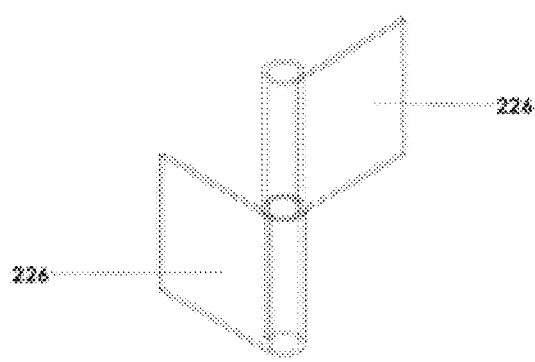
Figure 59:
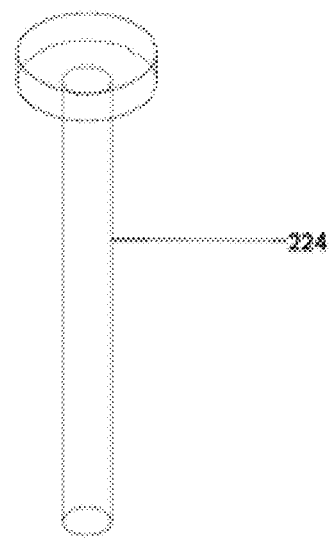
Figure 60:
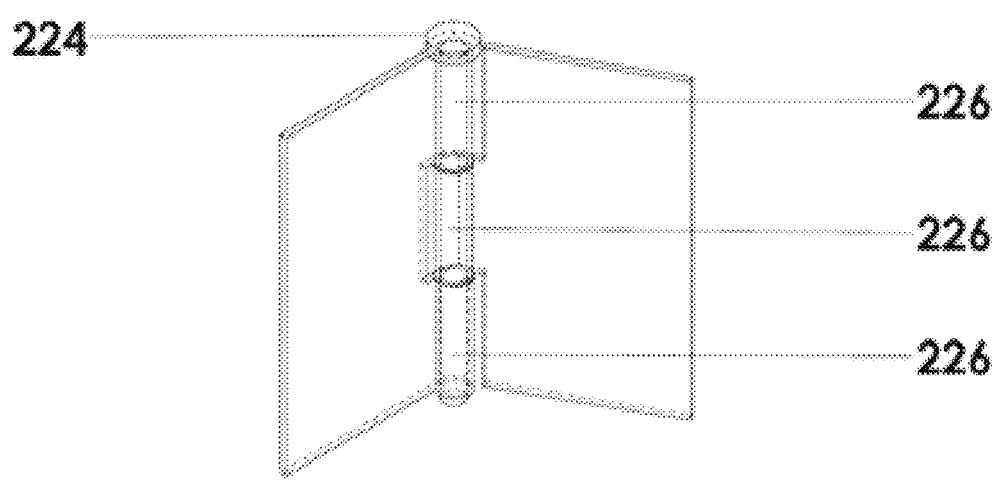
FIG. 60 is a perspective view of one embodiment of a removable pin inserted into three interlocking partial curls.

A cross-section of two overlaid interlocking partial curls 226 are seen in FIG. 58. One embodiment of a removable pin 224 which would be inserted along the overlapping axis of the interlocking partial curls 226 is seen in FIG. 59. The affect of interlocking partial curls 226 continuous with adjacent, joined panels is seen in FIG. 60.

Figure 61:
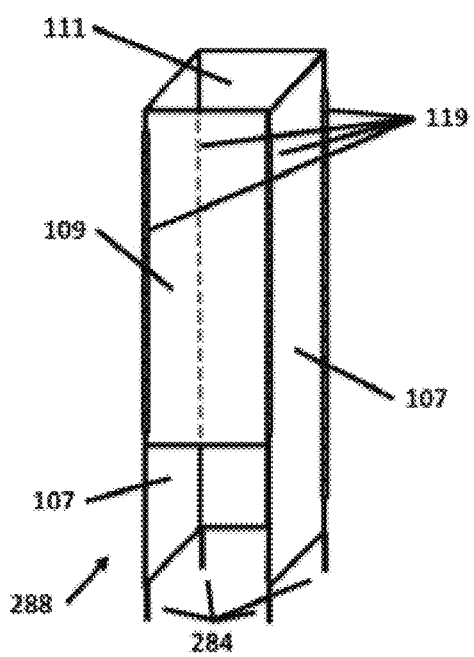
FIG. 61 is a perspective view of one embodiment of a rectangular chimney apparatus with chimney apparatus stability legs.
Figure 62:
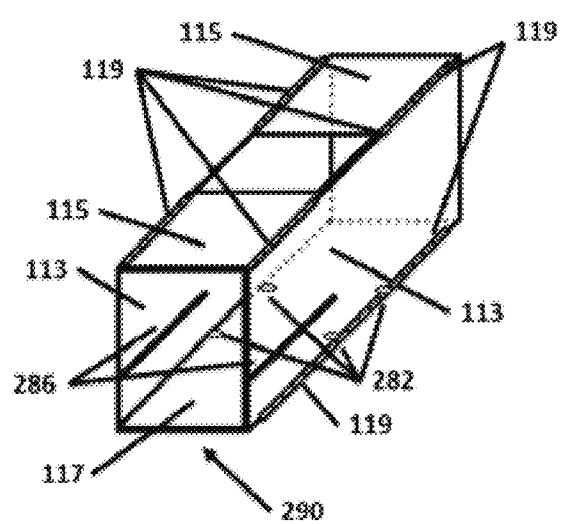
FIG. 62 is a perspective view of one embodiment of a fuel and air intake apparatus with holes for chimney apparatus stability legs and separator plate supports.

Alternate embodiments of a chimney apparatus with stability legs 288 is depicted in FIG. 61. In this embodiment, the chimney apparatus stability legs 284 insert into the holes for chimney apparatus stability legs 282 located in the bottom plate of the fuel and air intake apparatus with holes for chimney apparatus stability legs 290, as depicted in FIG. 62. FIG. 62 also depicts the addition of rails, rods, or narrow plates serving as separator plate supports 286, which enables the use of a separator plate without the need for inserting the plate into slots in the chimney apparatus 288 and/or fuel and air intake apparatus.

It will be apparent to those of ordinary skill in the art that alternative embodiments, including any number of substituted arrangements of the component embodiments described in the above teaching, may be produced given the foregoing description. As such, any variations, combinations, and alternative embodiments are accordingly considered within the scope of the present invention.

Any directional references (e.g. upper, lower, above, below, left, right, top, bottom, above, below, etc.) are used exclusively for identification purposes as an aid to understanding of the embodiments provided, and do not create limitations, particularly as to the position, orientation, or the use of the invention. Joinder references do not necessarily imply direct, contact, and are to be construed broadly and may include components interspersed between elements described as attached or connected in the described embodiments.

It is intended that all matter contained in the above description or accompanying drawings would be interpreted as exclusively illustrative and not exhaustive. That is, the description is in no way intended to limit the invention, to the embodiments specifically described. Any arrangement of portable, independent rocket stove components assembled within an outer housing calculated to form a similar structure and achieve a similar purpose could be substituted for the specific examples shown. Changes in structure, material, or detail may be made without departing from the spirit of the invention. This application is intended to cover such changes.

I claim:

1. A collapsible, portable biomass stove comprising:
   a. a collapsible housing apparatus which expands to a predetermined volume from a fraction of its collapsed volume, wherein in an expanded volume the stove is capable of supporting a cooking surface, said housing having an air and fuel intake opening for allowing insertion of biomass fuel into an interior of the housing in an expanded volume;
   b. a chimney apparatus inserted into the interior of the housing in an expanded volume which serves as a means to convey heat and combustion products away from a combustion chamber located in the interior of the expanded volume within the chimney, of appropriate dimension to serve as a means of maintaining wood gases released in said combustion chamber at sufficiently high temperatures as they rise through said chimney apparatus as to achieve secondary combustion of wood gases, one side of said chimney apparatus containing at least one opening for the passage of fuel and air into said chimney apparatus;
   c. an insulation chamber located in between the exterior of the chimney apparatus and an interior surface of the housing in an expanded volume, said insulation chamber contiguous with said chimney apparatus, wherein the insulation chamber allows for the use of insulation material to shield the user during a combustion process from high temperatures during the secondary combustion in the chimney apparatus and raise the operating temperature of said chimney apparatus.

2. A collapsible, portable biomass stove comprising:
   a. a collapsible housing apparatus which expands to a predetermined volume from a fraction of its collapsed volume, wherein in an expanded volume the stove is capable of supporting a cooking surface, said housing having an air and fuel intake opening for allowing insertion of biomass fuel into an interior of the housing in an expanded volume;
   b. a fuel and air intake apparatus which serves as a means to convey biomass fuel and air to a chimney apparatus, said fuel and air intake apparatus containing at least one opening to allow for the insertion of said chimney apparatus;
   c. a chimney apparatus inserted into said opening of said fuel and air intake apparatus within the interior of the housing in an expanded volume which serves as a means to convey heat and combustion products away from a combustion chamber located in the interior of the expanded volume of the housing and within the chimney, of appropriate dimension to serve as a means of maintaining wood gases released in said combustion chamber at sufficiently high temperatures as they rise through said chimney apparatus as to achieve secondary combustion of wood gases, one side of said chimney apparatus containing at least one opening for the passage of fuel and air into said chimney apparatus;
   d. an insulation chamber located in between the exterior of the chimney apparatus and an interior surface of the housing in an expanded volume, said insulation chamber contiguous with said chimney apparatus, wherein the insulation chamber allows for the use of insulation material to shield the user during a combustion process from high temperatures during the secondary combustion in the chimney apparatus and raise the operating temperature of said chimney apparatus.

3. The collapsible, portable biomass stove of claim 1, wherein:
   a. said collapsible housing apparatus which expands to a predetermined volume from a fraction of its collapsed volume, comprised of four substantially rectangular planes hingedly attached to one another along parallel edges such that the said substantially rectangular planes may be advantageously reoriented so as to substantially comprise a right rectangular parallelepiped, wherein in an expanded volume the stove is capable of supporting a cooking surface, said housing having at least one opening to allow for an air and fuel intake apparatus for allowing insertion of fuel into an interior of the housing in an expanded volume.

4. The collapsible, portable biomass stove of claim 2, wherein:
   a. said fuel and air intake apparatus which serves as a means to convey biomass fuel and air to a chimney apparatus, said fuel and air intake apparatus further comprised of four substantially rectangular planes substantially in the configuration of an open-ended right rectangular parallelepiped, one plane of which containing at least one opening to allow for the insertion of said chimney apparatus.

5. The collapsible, portable biomass stove of claim 2, wherein:
   a. said fuel and air intake apparatus which serves as a means to convey biomass fuel and air to a chimney apparatus, said fuel and air intake apparatus further comprised of four substantially rectangular planes substantially in the configuration of an open-ended right rectangular parallelepiped, hingedly attached to one another along the long edges of each rectangular plane, one plane of which containing at least one opening to allow for the insertion of said chimney apparatus.

6. The collapsible, portable biomass stove of claim 2, wherein:

a. a separator plate comprised of a substantially rectangular plane whereby the separator plate is suspended within the fuel and air intake apparatus by slidingly inserting the separator plate into the fuel and air intake apparatus and the chimney apparatus, whereby said separator plate serves as a means to provide an air passage independent of the fuel passage to the combustion chamber within the chimney apparatus.

7. The collapsible, portable biomass stove of claim 2, wherein:
a. a sliding grate apparatus which slidingly inserts into said fuel and air intake apparatus to provide a means for the removal of ash and debris from said combustion chamber, whereby said sliding grate apparatus may be advantageously slidingly extracted through one end of said fuel and air intake apparatus.

8. The collapsible, portable biomass stove of claim 2, wherein:
a. a separator plate comprised of a substantially rectangular plane hingedly attached to a substantially rectangular plane of said fuel and air intake apparatus, whereby the separator plate is advantageously rotated about the hinge axis and rests on a support attached to the substantially rectangular plane opposite the hinged edge of said separator plate so as to suspend said separator plate between the top and bottom substantially rectangular planes of the fuel and air intake apparatus when said fuel and air intake apparatus is in an expanded configuration, and lays flat against the bottom substantially rectangular plane when said fuel and air intake apparatus is in a collapsed configuration, whereby said separator plate serves as a means to provide an air passage independent of the fuel passage to the combustion chamber within the chimney apparatus.

9. The collapsible, portable biomass stove of claim 2, wherein:
a. an auxiliary gravity-fed fuel and air intake apparatus which serves as a means of using the weight of biomass to feed fuel into said combustion chamber as it is consumed, whereby said fuel and air intake apparatus may be advantageously slidingly inserted through at least one opening in said collapsible housing apparatus and through at least one opening in said fuel and air intake apparatus for use and removed for transport and storage of said portable, collapsible biomass stove.

10. The collapsible, portable biomass stove of claim 2, wherein:
a. a sliding grate apparatus which slidingly inserts into said fuel and air intake apparatus to provide a means for the removal of ash and debris from said combustion chamber, whereby said sliding grate apparatus may be advantageously extracted through one end of said fuel and air intake apparatus.

11. The collapsible, portable biomass stove of claim 2, wherein:
a. said fuel and air intake apparatus is composed of austenitic steel;
b. said chimney apparatus is composed of austenitic steel.

12. The collapsible, portable biomass stove of claim 1, wherein:
a. said chimney apparatus inserted into the interior of the housing in an expanded volume which serves as a means to convey heat and combustion products away from a combustion chamber located in the interior of the expanded volume within the chimney, said chimney apparatus comprised of four substantially rectangular planes substantially in the configuration of an open-ended right rectangular parallelepiped, of appropriate dimension to serve as a means of maintaining wood gases released in said combustion chamber at sufficiently high temperatures as they rise through said chimney apparatus as to achieve secondary combustion of wood gases, one side of said chimney apparatus containing at least one opening for the passage of fuel and air into said chimney apparatus.

13. The collapsible, portable biomass stove of claim 1, wherein:
a. said chimney apparatus inserted into the interior of the housing in an expanded volume which serves as a means to convey heat and combustion products away from a combustion chamber located in the interior of the expanded volume within the chimney, said chimney apparatus comprised of four substantially rectangular planes, hingedly attached to one another along the long edges of each rectangular plane in the configuration of an open-ended right rectangular parallelepiped when the chimney apparatus is in an expanded configuration, of appropriate dimension to serve as a means of maintaining wood gases released in said combustion chamber at sufficiently high temperatures as they rise through said chimney apparatus as to achieve secondary combustion of wood gases, one side of said chimney apparatus containing at least one opening for the passage of fuel and air into said chimney apparatus.

14. The collapsible, portable biomass stove of claim 1, wherein:
a. Said collapsible housing apparatus further includes a bottom panel comprised of a substantially rectangular plane hingedly attached to the bottom edge of one of the substantially rectangular planes of said collapsible housing apparatus such that said bottom panel may be advantageously rotated about the hinge axis to lay flat against one of the substantially rectangular planes in a collapsed configuration or lay parallel to the ground in an expanded configuration, whereby said bottom panel is supported by at least one tab on the substantially rectangular plane opposite said bottom panel hinge.

15. The collapsible, portable biomass stove of claim 1, wherein:
a. said collapsible housing apparatus is comprised of a substantially rectangular sheet with at least one opening to accommodate the insertion of said fuel and air intake apparatus, whereby opposite ends of said substantially rectangular sheet may be advantageously bent towards one another until the ends of the sheet overlap and the sheet is substantially in the shape of an open-ended cylinder, whereby said cylinder is fixed in place.

16. The collapsible, portable biomass stove of claim 1, wherein:
a. said collapsible housing apparatus is comprised of four substantially rectangular planes, at least one of which contains an opening for said fuel and air intake apparatus, whereby each of said substantially rectangular planes contain distal slots along and parallel to the long edges such that the planes may be advantageously assembled perpendicular to one another so as to comprise a right rectangular parallelepiped when in an assembled configuration.

17. The collapsible, portable biomass stove of claim 1, wherein:
a. said collapsible housing apparatus contains at least one opening on opposite sides situated at different distances from the base of said collapsible housing apparatus such that said fuel and air intake apparatus may be slidingly inserted at a predetermined angle into said two openings;

b. said fuel and air intake apparatus further including a tab to maintain the stability of said fuel and air intake apparatus in an inclined position within said collapsible housing apparatus.

18. A method of maintaining the environmental and efficiency benefits of a secondary-burn biomass stove while removing the need for the weight and volume of permanent insulation, the method comprising:

a. expanding a collapsible housing apparatus and placing it on a level surface, and b. inserting a biomass fuel and air intake apparatus into predetermined openings in said collapsible housing apparatus, and c. inserting a chimney apparatus into a predetermined opening in the biomass fuel and air intake apparatus, and d. inserting insulation material into an insulation chamber interior to the collapsible housing apparatus and exterior to both said biomass fuel and air intake apparatus and said chimney apparatus, said insulation chamber contiguous with said chimney apparatus.

* * * * *